United States Patent
Yamaguchi et al.

(10) Patent No.: US 7,389,057 B2
(45) Date of Patent: Jun. 17, 2008

(54) IMAGE FORMING APPARATUS MONITORING SYSTEM AND METHOD, PROGRAM AND STORAGE MEDIUM

(75) Inventors: Kotaro Yamaguchi, Ohta-ku (JP); Yoshimasa Kawana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 11/425,636

(22) Filed: Jun. 21, 2006

(65) Prior Publication Data

US 2006/0291871 A1    Dec. 28, 2006

(30) Foreign Application Priority Data

Jun. 23, 2005  (JP)  ............................. 2005-183271
Apr. 27, 2006  (JP)  ............................. 2006-123781

(51) Int. Cl.
*G03G 15/00* (2006.01)

(52) U.S. Cl. .............................................. 399/8; 399/9

(58) Field of Classification Search .................... 399/8, 399/9, 21

See application file for complete search history.

(56) References Cited

U.S. PATENT DOCUMENTS 5,424,808 A * 6/1995 Maekawa et al. ........... 399/8 X
5,715,496 A * 2/1998 Sawada et al. ................. 399/8
5,850,582 A * 12/1998 Inoo et al. ..................... 399/8
5,913,090 A * 6/1999 Sawada et al. ................. 399/8
6,876,819 B2 * 4/2005 Sawada et al. ................. 399/9

FOREIGN PATENT DOCUMENTS

JP    03-293369 A    12/1991
JP    11-321038 A    11/1999
JP    2003-316668 A    11/2003

* cited by examiner

*Primary Examiner*—Sandra L Brase
(74) *Attorney, Agent, or Firm*—Canon USA Inc IP Division

(57) ABSTRACT

A system remotely monitors at least one image forming apparatus. The system receives first operation information and second operation information concerning the image forming apparatus. The system is capable of detecting a frequent occurrence of failures in the image forming apparatus based on the first operation information. The system is further capable of detecting a resolution of the frequent occurrence of failures based on the second operation information. In response to the detection of the resolution of the frequent occurrence of failures, the system outputs information that explicitly indicates the resolution of the frequent occurrence of failures.

23 Claims, 18 Drawing Sheets

FIG.8

TOTAL COUNTER HISTORY TABLE

| HISTORY | ACQUISITION DATE AND TIME | TOTAL COUNTER VALUE |
|---|---|---|
| 018110 | 2004/12/25 13:40 | 25550 |
| 018111 | 2004/12/26 13:40 | 25660 |
| 018112 | 2004/12/27 13:40 | 25810 |
| 018113 | 2004/12/28 13:40 | 26420 |
| 018114 | 2004/12/29 13:40 | 26910 |
| 018115 | 2004/12/30 13:40 | 27350 |
| 018116 | 2004/12/31 13:40 | 27500 |
| 018117 | 2005/01/01 13:40 | 27890 |
| 018118 | 2005/01/02 13:40 | 28400 |
| 018119 | 2005/01/03 13:40 | 28770 |
| ⋮ | ⋮ | ⋮ |

FIG.9

COMPONENT COUNTER HISTORY TABLE

| HISTORY | ACQUISITION DATE AND TIME | COMPONENT COUNTER VALUE |
|---|---|---|
| 018110 | 2004/12/25 13:40 | 25550 |
| 018111 | 2004/12/26 13:40 | 25660 |
| 018112 | 2004/12/27 13:40 | 25810 |
| 018113 | 2004/12/28 13:40 | 450 |
| 018114 | 2004/12/29 13:40 | 940 |
| 018115 | 2004/12/30 13:40 | 1380 |
| 018116 | 2004/12/31 13:40 | 1530 |
| 018117 | 2005/01/01 13:40 | 1920 |
| 018118 | 2005/01/02 13:40 | 2430 |
| 018119 | 2005/01/03 13:40 | 2800 |
| ⋮ | ⋮ | ⋮ |

FIG.10

JAM HISTORY TABLE

| HISTORY | JAM CODE | OCCURRENCE DATE AND TIME | TOTAL COUNTER VALUE |
|---|---|---|---|
| (1) | 010011 | 2004/11/08 10:04 | 16000 |
| (2) | 000101 | 2004/11/10 15:31 | 18000 |
| (3) | 001011 | 2004/11/15 09:30 | 20000 |
| (4) | 020101 | 2004/11/22 12:12 | 23000 |
| (5) | 001442 | 2004/11/28 11:53 | 24000 |
| (6) | 001442 | 2004/12/10 09:49 | 24500 |
| (7) | 001442 | 2004/12/25 14:00 | 24700 |
| (8) | 001442 | 2004/12/25 08:55 | 25500 |
| (9) | 001442 | 2004/12/26 16:10 | 25700 |
| (10) | 001442 | 2004/12/27 12:58 | 25800 |
| (11) | 020099 | 2005/01/02 15:28 | 28480 |
| ⋮ | ⋮ | ⋮ | ⋮ |

FIG.14

INTER-JAM PRINTED-SHEET
NUMBER HISTORY TABLE

600

| HISTORY | OCCURRENCE DATE AND TIME | INTER-JAM PRINTED-SHEET NUMBER |
|---|---|---|
| (1) | 2004/11/08 10:04 | – |
| (2) | 2004/11/10 15:31 | 2000 |
| (3) | 2004/11/15 09:30 | 2000 |
| (4) | 2004/11/22 12:12 | 3000 |
| (5) | 2004/11/28 11:53 | 1000 |
| (6) | 2004/12/10 09:49 | 500 |
| (7) | 2004/12/25 14:00 | 200 |
| (8) | 2004/12/25 08:55 | 800 |
| (9) | 2004/12/26 16:10 | 200 |
| (10) | 2004/12/27 12:58 | 100 |
| (11) | 2005/01/02 15:28 | 2680 |
| ⋮ | ⋮ | ⋮ |

FIG.15

INTER-JAM PRINTED-SHEET NUMBER AVERAGE HISTORY TABLE ~700

| HISTORY | OCCURRENCE DATE AND TIME | INTER-JAM PRINTED-SHEET NUMBER | INTER-JAM PRINTED-SHEET NUMBER AVERAGE VALUE | |
|---|---|---|---|---|
| (1) | 2004/11/08 10:04 | — | — | |
| (2) | 2004/11/10 15:31 | 2000 | — | |
| (3) | 2004/11/15 09:30 | 2000 | — | |
| (4) | 2004/11/22 12:12 | 3000 | — | |
| (5) | 2004/11/28 11:53 | 1000 | 2000 | ((2)+(3)+(4)+(5))÷4 |
| (6) | 2004/12/10 09:49 | 500 | 1625 | ((3)+(4)+(5)+(6))÷4 |
| (7) | 2004/12/25 14:00 | 200 | 1175 | ((4)+(5)+(6)+(7))÷4 |
| (8) | 2004/12/25 08:55 | 800 | 625 | ((5)+(6)+(7)+(8))÷4 |
| (9) | 2004/12/26 16:10 | 200 | 425 | ((6)+(7)+(8)+(9))÷4 |
| (10) | 2004/12/27 12:58 | 100 | 325 | ((7)+(8)+(9)+(10))÷4 |
| (11) | 2005/01/02 15:28 | 2680 | 945 | ((8)+(9)+(10)+(11))÷4 |
| .. | .. | .. | .. | |

AVERAGE MODULUS 4 TIMES ~701

| DETECTION SENSITIVITY | THRESHOLD VALUE A | THRESHOLD VALUE B |
|---|---|---|
| HIGH | 800 | 900 |
| STANDARD | 500 | 600 |
| LOW | 200 | 300 |

FIG.16

From: administrator@xxxxxx.com
To: xxxxxxx@hanbai.com
Subject: Jam Notification
Date: Sun, 26 Dec 2004 16:11:05 +0900
———
FREQUENT JAM OCCURRENCE CONDITION HAS BEEN
DETECTED. PLEASE CHECK CONDITION.

COPYING MACHINE ID: 59au429t38
DETECTION DATE AND TIME: Sun, 26 Dec 2004 16:10:23 +0900

DETAILS ARE AVAILABLE FROM THE FOLLOWING URL:
https://www.system.com/jamgraph.html?id=xxxxxx

FIG.17

Jam Graph

*651* Customer
Name:
Customer ID:
Address1:
Address2:
Address3:
Address4:
Zip Code:
Country:
VIP:

*652* Contact (Device)
Name:
Tel:
Mobile Phone:
Fax:
E-mail:
Address Location:
Building
Address1:
Address2:
Address3:
Address4:
Zip Code:

*653* Contact (RDS)
Name:
Tel:
Mobile Phone:
Fax:
E-mail:
Address Location:
Building
Address1:
Address2:
Address3:
Address4:
Zip Code:

*654*    *655*

Sensitivity: Standard   Warning Lamp: ●—*658*

| Date | The Number of Sheets | 0 | 200 | 400 | 600 | 800 | 1000 | 1200 | 1400 | 1600 | 1800 | 2000 |
|---|---|---|---|---|---|---|---|---|---|---|---|---|
| 19-08-2002 | | | | | | | | | | | | |
| 18-08-2002 | | | | | | | *657* — 150 Sheets | | | | | |
| 17-08-2002 | | | | | | | | | | | | |
| 16-08-2002 | | | | | | | | | | | | |
| 15-08-2002 | | | | | | | | | | | | |
| 14-08-2002 | | | | | | | | | | | | |
| 13-08-2002 | | | | | | | | | | | | |
| 12-08-2002 | | | | | | | | | | | | |
| 11-08-2002 | | | | | | | | | | | | |
| 10-08-2002 | | | | | | | | | | | | |
| 09-08-2002 | | | | | | | | | | | | |
| 08-08-2002 | | | | | | | | | | | | |
| 07-08-2002 | | | | | | | | | | | | |
| 06-08-2002 | | | | | | | | | | | | |
| 05-08-2002 | | | | | | | | | | | | |
| 04-08-2002 | | | | | | | | | | | | |
| 03-08-2002 | | | | | | | | | | | | |

Sensitivity
Change Sensitivity to: [Standard ▾] —*656*

[Save]

Jam Prescribed Radio Attained   —*654*

| Device | Model | Jam Date | Jam Code | Description | Paper Size | Paper Source | Total Counter Value |
|---|---|---|---|---|---|---|---|
| | | | | | | | |
| | | | | | | | |
| | | | | | | | |

FIG.18

From: administrator@xxxxxx.com
To: xxxxxxx@hanbai.com
Subject: Jam Notification
Date: Sun, 28 Dec 2004 15:00:11 +0900

---

RESOLUTION OF FREQUENT JAM OCCURRENCE CONDITION HAS BEEN DETECTED. PLEASE CHECK CONDITION.

COPYING MACHINE ID: 59au429t38
DETECTION DATE AND TIME: Sun, 28 Dec 2004 15:00:10 +0900
REPLACEMENT COMPONENT:

| COMPONENT NO. | COMPONENT NAME | COUNTER |
|---|---|---|
| XY-RL10 | PAPER EJECTION ROLLER | 450 |
| SB-FP01 | PAPER EJECTION FLAPPER | 50 |

DETAILS ARE AVAILABLE FROM THE FOLLOWING URL:
https://www.system.com/jamgraph.html?id=xxxxxx

IMAGE FORMING APPARATUS MONITORING SYSTEM AND METHOD, PROGRAM AND STORAGE MEDIUM

BACKGROUND OF THE INVENTION

1. Field of the Invention

The present invention relates to a system configured to perform remote management of an image forming apparatus.

2. Description of the Related Art

Hitherto, there has been a system configured to remotely monitor the operating condition of image forming apparatuses, such as a copying machine and a printer, connected to a LAN (Local Area Network).

In such a system, each of a plurality of image forming apparatuses communicates with a monitoring host, which monitors the plurality of image forming apparatuses, through a LAN, a WAN (Wide Area Network), and the Internet. Each of the image forming apparatuses may periodically notify the monitoring host of information about, for example, the number of sheets to print. Also, each of the image forming apparatuses may notify the monitoring host of information about jams/alarms/errors with timing information when such an event occurs.

When the monitoring host receives a notification from an image forming apparatus, the monitoring host stores and manages the notified information. Thus, the monitoring host detects the operating condition of the image forming apparatus and also deals with a trouble occurring in the image forming apparatus.

Also, a system has been proposed, which is adapted such that after a lapse of a predetermined time since an image forming apparatus notifies a monitoring host of an occurrence of an error, the image forming apparatus notifies the monitoring host of a status thereof again to make the monitoring host recognize the termination of the error (see Japanese Patent Application Laid-Open No. 2003-316668).

For example, one of such systems is configured such that a monitoring host detects a frequent jam occurrence condition by measuring an increase in frequency of occurrences of jams while collecting information about jams occurring in the image forming apparatus (see, Japanese Patent Application Laid-Open No. 03-293369). Also, when detecting that an occurrence of an error is left unchecked, techniques of notifying a service center that the error continues to occur in the image forming apparatus have been proposed (see, Japanese Patent Application Laid-Open No. 11-321038).

A result of the detection is notified to an administrator of the image forming apparatus and is utilized for prompting a maintenance operation, such as component replacement. Causes of occurrences of jams include not only those requiring component-replacement maintenance, for example, resulting from the wear of a component of the image forming apparatus, but also many accidental ones due to the state of print media to be fed, which may be effected by temperature and humidity at a given time and due to an improper use of the image forming apparatus.

Hitherto, several methods of measuring an increase in frequency of occurrences of jams in the image forming apparatus have been proposed. However, generally, in a case where a maintenance operation is performed to recover from a jam condition after the monitoring host has detected a frequent jam occurrence condition, the frequent occurrence of the jam is often subsequently reduced, so that no jam occurrence notification is outputted.

Therefore, it may be difficult for a serviceman to determine the termination of a frequent jam occurrence condition only by measurement of a high frequency of jams, which is triggered off by the occurrence of a jam. For instance, especially, when the frequent occurrence of jams due to accidental causes is detected, a serviceman may be sent from a sales company in charge of maintenance of the image forming apparatus to perform an unnecessary maintenance operation. Similar problems occur in failures other than jams.

Additionally, the related system configured to recognize the frequency of occurrences of failures, such as jams, determines only the degree of harm caused by the occurrence of the failure. That is, when no jam occurs, the related system performs no particular processing and cannot notify a serviceman of a frequent jam occurrence condition.

SUMMARY OF THE INVENTION

Embodiments of the present invention are provided to overcome the above-described drawbacks of the related systems.

According to an aspect of the present invention, an image forming apparatus monitoring system configured to monitor at least one image forming apparatus is provided. The image forming apparatus monitoring system includes a reception unit configured to receive first operation information and second operation information concerning the image forming apparatus and a storage unit configured to store the first operation information and the second operation information received by the reception unit. The image forming apparatus monitoring system further includes a first detection unit configured to detect a frequent occurrence of failures in the image forming apparatus based on the first operation information, a second detection unit configured to detect a resolution of the frequent occurrence of failures based on the second operation information as a trigger of detecting the resolution. The image forming apparatus monitoring system includes an output unit configured to output information that explicitly indicates the resolution of the frequent occurrence of failures in response to the detection of the resolution of the frequent occurrence of failures.

According to another aspect of the present invention, a method is provided to monitor at least one image forming apparatus. The method includes receiving first operation information and second operation information concerning the image forming apparatus, storing the first operation information and the second operation information received, detecting a frequent occurrence of failures in the image forming apparatus based on the first operation information, detecting a resolution of the frequent occurrence of failures based on the second operation information, and outputting information that explicitly indicates the resolution of the frequent occurrence of failures in response to the detection of the resolution of the frequent occurrence of failures.

Moreover, a program that performs the method according to an embodiment of the present invention and a recording medium that stores the program are provided.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram illustrating an example of a total counter history table managed in the monitoring host according to an embodiment of the present invention.

FIG. 9 is a diagram illustrating an example of a component counter history table managed in the monitoring host according to an embodiment of the present invention.

FIG. 10 is a diagram illustrating an example of a jam history table managed in the monitoring host according to an embodiment of the present invention.

FIG. 14 is a diagram illustrating an example of an inter-jam printed sheet number history table managed in the monitoring host according to an embodiment of the present invention.

FIG. 15 is a diagram illustrating an example of an inter-jam printed sheet number average history table managed in the monitoring host according to an embodiment of the present invention.

FIG. 16 is a diagram illustrating an example of an e-mail notifying the detection of a frequent failure occurrence condition according to an embodiment of the present invention.

FIG. 17 is a diagram illustrating a jam graph window provided by the monitoring host according to an embodiment of the present invention.

FIG. 18 is a diagram illustrating an example of an e-mail notifying the detection of resolution of a frequent failure occurrence condition according to an embodiment of the present invention.

DETAILED DESCRIPTION OF THE EMBODIMENTS

Exemplary embodiments of the present invention will be described in detail below with reference to the accompanying drawings.

First Exemplary Embodiment

Figure 1:
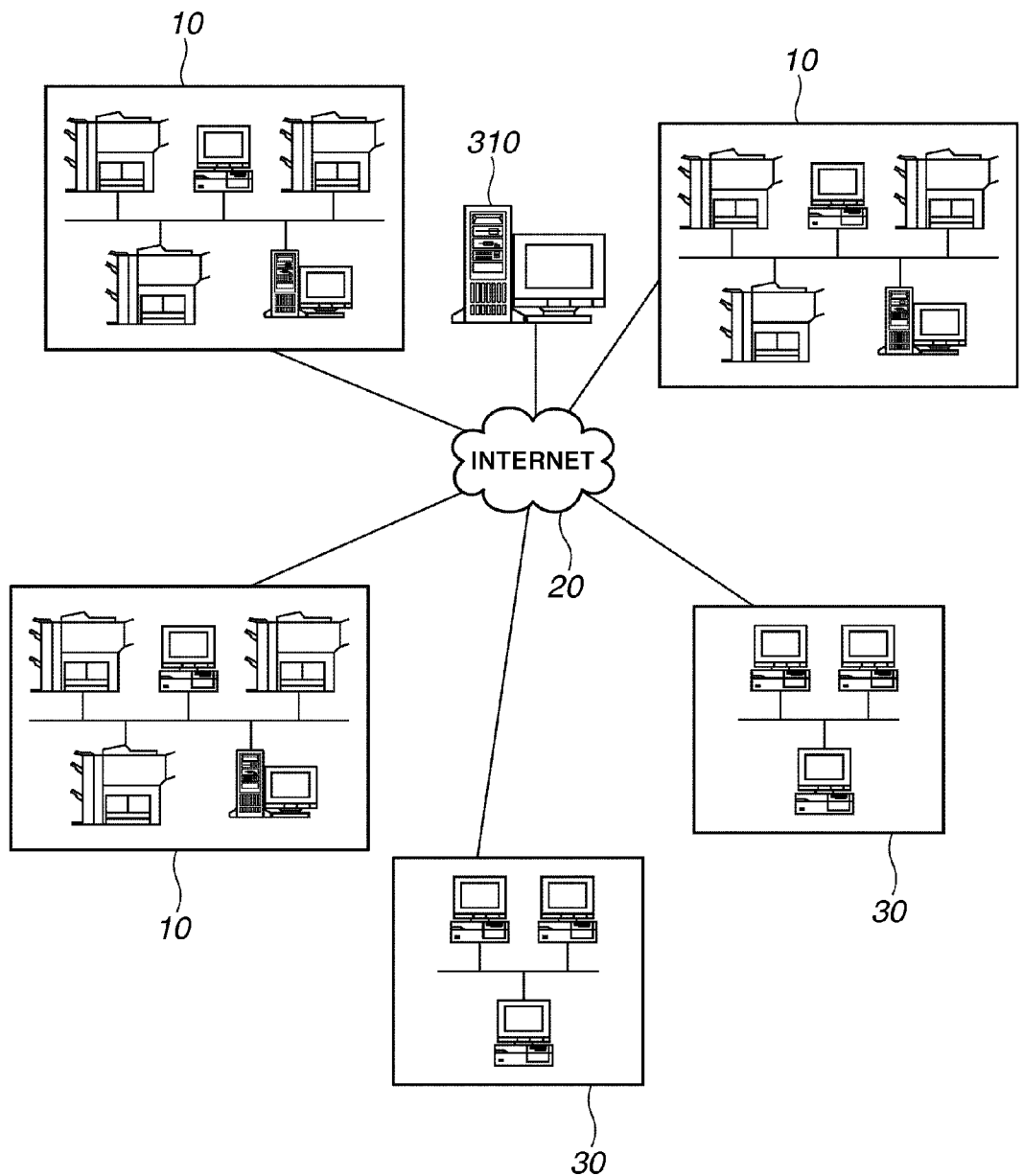
FIG. 1 is a diagram of a system for remotely managing image forming apparatus according to an embodiment of the present invention, illustrating an example of the connection relation among a monitoring host, a client intranet environment, and a sales company intranet environment through the Internet.

FIG. 1 is a diagram illustrating a system for remotely managing image forming apparatuses according to an exemplary embodiment of the present invention.

In FIG. 1, reference numeral 310 designates a monitoring host configured to centrally monitor the operating conditions of image forming apparatuses. The monitoring host 310 communicates with a station monitoring apparatus and with personal computers (hereunder referred to as PCs), which are provided in a sales company intranet, through the Internet. In FIG. 1, the monitoring host and the user station are configured to communicate with each other through the Internet as an example of a communication line. Other communication lines can be applied to this system. For instance, a wireless network can be applied thereto. As shown in FIG. 1, the monitoring host 310 includes a single computer. However, the configuration of the monitoring host according to the present invention is not limited thereto. For example, the monitoring host can be configured by distributing a processing load to a plurality of computers and connecting the plurality of computers to one another. As long as an image forming apparatus monitoring system has each characteristic function (to be described later), the image forming apparatus monitoring system may be constructed by a single computer. Alternatively, the system may be constructed by a plurality of computers. In the following description, the term "the monitoring host 310" is used to describe the apparatus. This term "monitoring host" designates the aforementioned image forming apparatus monitoring system. That is, the term "monitoring host" can be interpreted either as a single computer or as a plurality of computers.

Reference numeral 10 denotes a client intranet environment. In the client intranet environment 10, image forming apparatuses and station monitoring apparatuses are provided, connected to one another through a LAN. The station monitoring apparatus is adapted to monitor the image forming apparatuses provided in the same LAN. Each station monitor apparatus communicates with the monitoring host 310 through the Internet 20.

Reference numeral 30 denotes a sales company intranet environment. In the sales company intranet, at least one PC is provided. Each PC communicates with the monitoring host 310 through the Internet.

Figure 2:
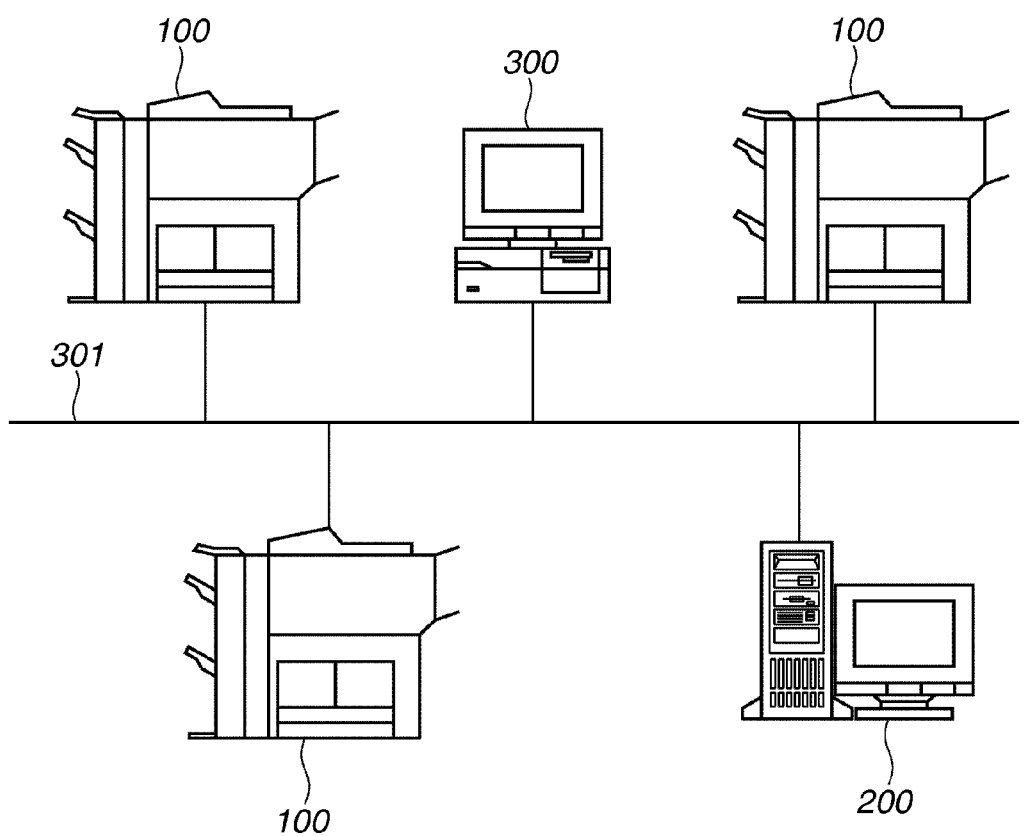
FIG. 2 is a diagram of a client intranet environment according to an embodiment of the present invention, illustrating an example of the connection among copying-machines and a station monitoring apparatus in the client intranet.

FIG. 2 is a diagram of the client intranet environment according to an embodiment of the present invention, illustrating an example of the connection relation among copying-machines and the station monitoring apparatus in the client intranet.

In the illustrated client intranet environment 10, the image forming apparatus 100, the station monitoring apparatus 200, and a PC 300 used by a user to perform business operations are connected to one another through the LAN 301. The station monitoring apparatus 200 communicates with the image forming apparatus 100 through the LAN 301 according to communication schedule thereof. The station monitoring apparatus 200 is capable of obtaining information about the setting of an operation mode in the image forming apparatus 100, a print counter value, a component counter value representing an operating amount of each component, operation history information, such as an operation log, and failure information about a service call, a jam, and an alarm, through the communication. In an exemplary embodiment, an MIB (Management Information Base) information communication method according to SNMP (Simple Network Management Protocol) is used as a communication method to provide communication between the station monitoring apparatus 200 and the image forming apparatus 100.

Also, the station monitoring apparatus 200 is capable of notifying the monitoring host 310 of the obtained information, and accepting various requests (an information acquisition request/a communication schedule setting request/a firmware update request) from the monitoring host 310 through the Internet 20. In an exemplary embodiment, an SMTP (Simple Mail Transfer Protocol) is used as a communication method to provide communication between the station monitoring apparatus 200 and the monitoring host 310. In following description, it is assumed that various information on the image forming apparatus is notified to the monitoring host 310 through the station monitoring apparatus 200. However, the mode of communication is not limited thereto. For instance, the following mode can be employed. That is, the image forming apparatus may notify the monitoring host 310 of various information without going through the station monitoring apparatus 200. In this case, the format of a notification from the image forming apparatus to the monitoring host 310 is the same as or similar to that shown in FIG. 6, which will be described later, with the exception of a part relating to the station monitoring apparatus 200.

The image forming apparatus 100 described herein may represent a digital compound copying machine that integrates a printer, a scanner, and a facsimile function. Alternatively or in addition to, the image forming apparatus 100 described herein may represent other types of image forming apparatus, including a printer, a scanner, and/or a facsimile machine. However, in the following description, specific details of a digital compound copying machine (hereunder referred to simply as a "copying machine") serving as an image forming apparatus 100 are set forth in order to provide a thorough understanding of the exemplary embodiments of the present invention. However, it will be apparent to one skilled in the art that the exemplary embodiments of the present invention may be practiced without these specific details. Furthermore, it is noted that features of the exemplary embodiments of the present invention may be practiced with any suitable type of image forming apparatus, including a printer, a facsimile apparatus and/or a scanner.

Figure 3:
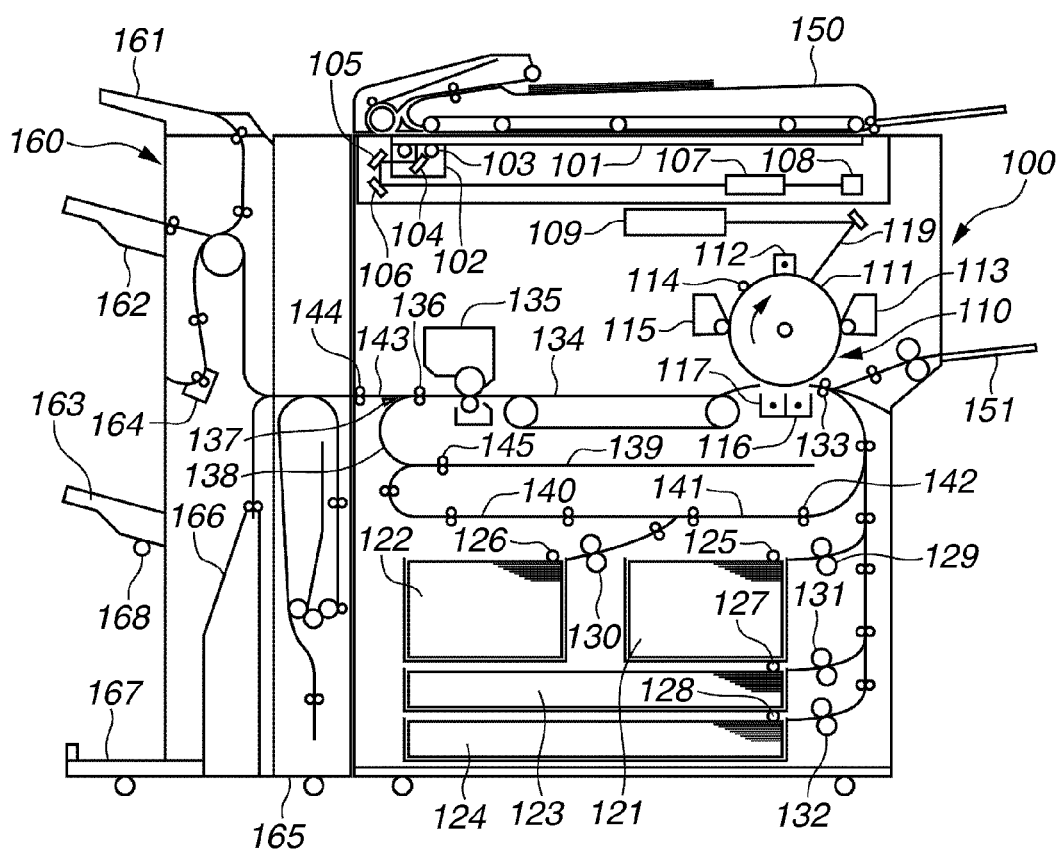
FIG. 3 is a diagram illustrating an example of the internal hardware configuration of an image forming apparatus according to an exemplary embodiment of the present invention.

FIG. 3 is a cross-sectional diagram illustrating the hardware configuration of an exemplary copying machine 100 serving as the image forming apparatus according to an embodiment of the present invention. In the following description, the copying machine is described as an example of the image forming apparatus. However, various apparatuses, such as a printer having no copying function, a facsimile apparatus, a scanner, and a personal computer, can be also employed as the image forming apparatus. In FIG. 3, reference numeral 150 designates an automatic document feeder (ADF). Reference numeral 102 denotes a scanner. The scanner 102 includes a document illuminating lamp 103 and a scanning mirror 104.

The automatic document feeder 150 is configured such that originals are conveyed sheet by sheet onto a platen glass 101 from the last sheet thereof, and that the original is discharged upon completion of reading this original. The scanner 102 driven by a motor (not shown) performs a reciprocating scan on original conveyed onto the platen glass 101. Reflection light from the original is transmitted by a lens 107 through the scanning mirrors 104 to 106. Then, an image from the reflection light is formed onto a CCD sensor, which is provided in an image sensor 108. Reference numeral 109 designates an exposure control unit including a laser and a polygon scanner. The exposure control unit 109 irradiates a photoreceptor drum 111 with laser light 119 modulated according an image signal, which is converted into an electrical signal in the image sensor unit 108, and undergoes predetermined image processing.

A primary charging device 112, a development device 113, a transfer charging device 116, a pre-exposure lamp 114, and a cleaning device 115 are equipped around the photoreceptor drum 111. The photoreceptor drum 111 rotates in the direction of an arrow driven by a motor (not shown) in an image forming unit 110. After the photoreceptor drum 111 is electrically charged by the primary charging device 112 at a desired potential level, laser light 119 is irradiated on the photoreceptor drum 111 from the exposure control unit 109. Accordingly, an electrostatic latent image is formed thereon. The electrostatic latent image formed on the photoreceptor drum 111 is developed by the development device 113, and is visualized as a toner image.

Meanwhile, a sheet of a transfer paper fed by pickup rollers 125 to 128 from a right-side cassette deck 121, a left-side cassette deck 122, an upper cassette 123 or a lower cassette 124 is further fed to a transfer belt 134 by paper feeding rollers 129 to 132 and a resist roller 133. A toner image visualized in the process is transferred onto the transfer paper by the transfer charging device 116. A multiple manual feeding tray 151 capable of accommodating 100 sheets of transfer paper is equipped therearound.

Residual toner is cleaned from the photoreceptor drum 111 by a cleaning device 115 after the toner image is transferred. Then, residual electric charge is eliminated by the pre-exposure lamp 114. After the transfer, the transfer paper is separated by a separation charging device 117 from the photoreceptor drum 111. Then, the transfer paper is conveyed by the transfer belt 134 to a fixing device 135. A toner image is fixed at the fixing device 135 being pressurized and heated. The fixed toner image is discharged out of the copying machine by a discharging roller 136.

Reference numeral 137 designates a paper ejection flapper that changes a path between a conveying path 138 and a discharging path 143. Reference numeral 140 denotes a lower conveying path that guides the transfer paper fed from the discharging roller 136 to a reverse paper refeeding path 141 through an inversion path 139. Also, the transfer paper fed from the left-side cassette deck 122 by a paper feeding roller 130 is guided to the refeeding path 141. Reference numeral 142 designates a paper refeeding roller adapted to refeed the transfer paper to the image forming unit 110. Reference numeral 144 denotes a discharging roller disposed in the vicinity of the ejection flapper 137. The discharging roller 144 discharges the transfer paper, the path of which is changed to the discharging path 143 by the ejection flapper 137, out of the machine.

At the time of two-sided recording (that is, two-sided copying), the ejection flapper 137 is upwardly raised to guide the copied transfer paper to the refeeding path 141 through the conveying path 138, the inversion path 139, and the lower conveying path 140. At that time, the rear end of the transfer paper entirely slips out of the conveying path 138 by an inversion roller 145. Then, the transfer paper is drawn into the inverse path 139 to a position at which the transfer paper is bitten (engaged) by the inverse roller 145. Subsequently, the transfer paper is fed to the conveying path 140 by reversing of the inversion roller 145.

When the transfer paper is discharged from the copying machine 100 being reversed, the ejection flapper 137 is upwardly raised. Then, the transfer paper is drawn into the inverse path 139 by the inversion roller 145 to a position, at which the rear end of the transfer paper remains on the conveying path 138. Subsequently, the inversion roller 145 is reversed to reverse the transfer paper. Thus, the transfer paper is fed out toward the discharging roller 144.

Reference numeral 160 designates a paper ejection unit configured to align and stitch sheets of transfer paper discharged from the copying machine 100. This unit loads the sheets of transfer paper, which are discharged sheet by sheet, on a processing tray 164 and aligns the sheets of transfer paper. After image formation of one document is finished, the sheets of transfer paper are stapled and are then discharged to a paper ejection tray 162 or 163.

The upward and downward movements of the ejection tray 163 are controlled by a motor (not shown). The ejection tray 163 is moved to the position of the processing tray 164 before an operation of forming an image is started. As the sheets of discharged transfer paper are loaded, the ejection tray 163 moves so that the height of the highest sheet of transfer paper coincides with the position of the processing tray 164. Reference numeral 168 designates a tray lower-limit sensor configured to detect the lowest limit of the ejection tray 163. The tray lower-limit sensor 168 is configured to detect that about 2000 sheets of transfer paper are loaded on the ejection tray 163.

Reference numeral 161 denotes a paper tray configured to stack sheets of partitioning paper to be inserted between the ejected sheets of transfer paper. Reference numeral 165 designates a Z-folding unit configured to perform Z-folding of the ejected transfer paper. Also, reference numeral 166 denotes a book-binding unit configured to perform book-binding by aligning a part of the sheets of ejected transfer paper and by performing center-folding and stapling thereon. A bundle of book-bound sheets of paper is discharged to the discharging tray 167.

Also, various sensors (not shown) are disposed at various places in this cross-sectional diagram. The sensors detect various failures occurring in the copying machine 100, such as run-out of toner, a jam of an original, a remaining amount of transfer paper, a jam of transfer paper, a remaining amount of a consumed material relating to the development, burning out of an original illuminating lamp.

Figure 4:
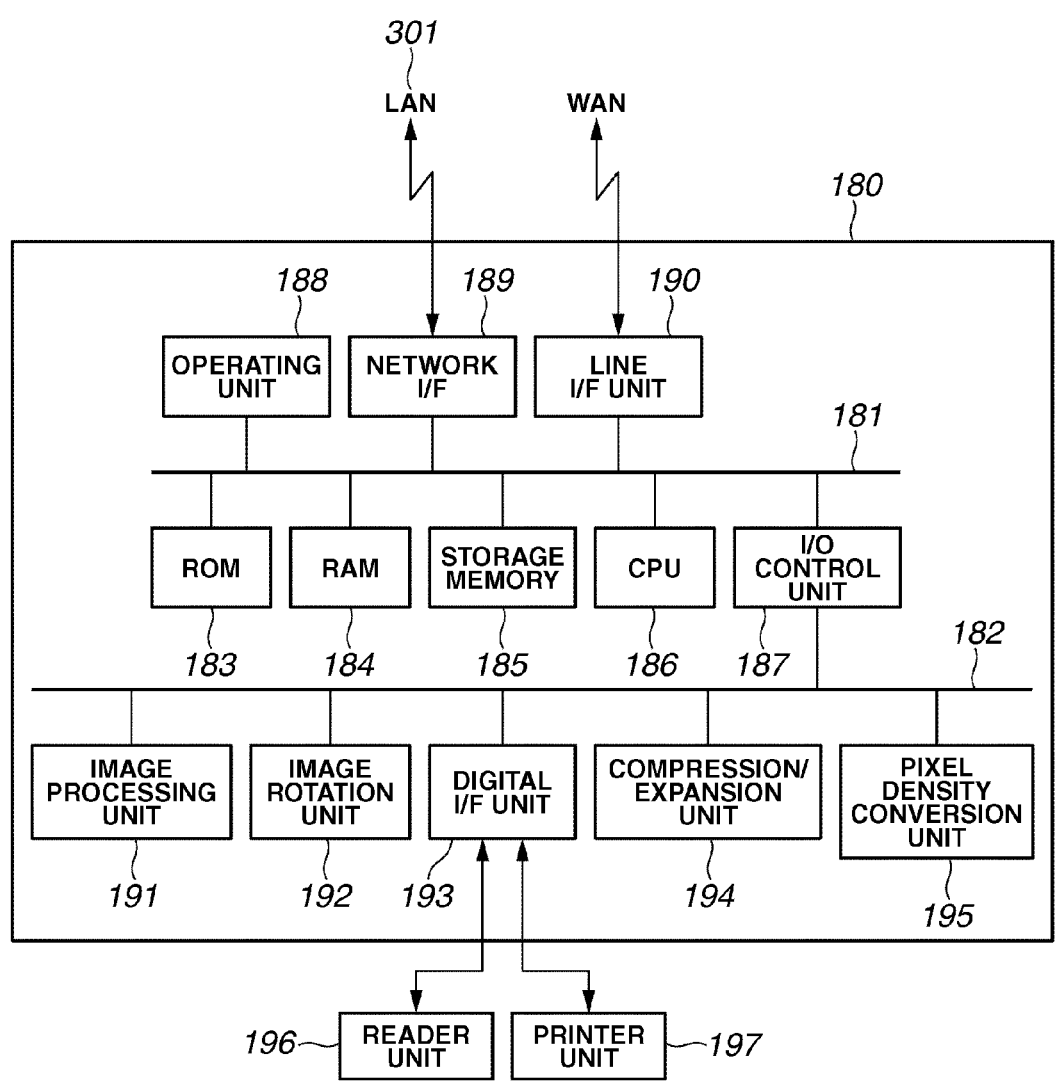
FIG. 4 is a block diagram illustrating a control unit of the image forming apparatus of FIG. 3 according to an exemplary embodiment of the present invention.

FIG. 4 is a block diagram illustrating an exemplary control unit 180 of the copying machine 100 serving as an image forming apparatus, according to an embodiment of the present invention.

Elements of the control unit 180 are connected to a system bus 181 and an image bus 182. A control program for the copying machine 100 is stored in a ROM 183. The control program is executed by a CPU 186. A RAM 184 serves as a work area used to execute the program, and also serves as an image memory used to temporarily store image data. A storage memory 185 is a non-volatile memory and stores information about the setting of various operating modes that has to be retained even after restart of the copying machine 100, a print sheet number counter value, a component counter value representing an operating amount of each component, an operation log, and failure information about service call errors/jams/alarms. A network I/F 189 serves as an interface unit used to establish connection with the LAN. The network I/F 189 communicates with the station monitoring apparatus 200 through the LAN 301. A line I/F unit 190 is connected to an ISDN line and a public telephone network and is controlled by a communication control program stored in the ROM 183. Also, the line I/F unit 190 transmits and receives data to and from a remote terminal through an ISDN I/F and an NCU (Network Control Unit). Transmission and reception operations of a facsimile are also performed by using this line I/F unit 190. An operating unit 188 includes a display unit and a key input unit. These elements are controlled by the CPU 186. An operator instructs various kinds of setting concerning scanner reading and print-out, and also instructs activation/stoppage. The above-described elements are connected to a system bus 181.

An I/O control unit 187 is a bus bridge adapted to connect a system bus 181 to an image bus 182 that transmits image data at a high speed. The image bus 182 includes a PCU bus or an IEEE 1394 bus. The following devices are coupled to the image bus 182. That is, a digital I/F unit 193 connects a reader unit 196 of the copying machine 100 and a printer unit 197 to a control unit 180 and performs the conversion of image data between a synchronization system and a non-synchronization system. Also, information detected by the various sensors disposed at various places in the reader unit 196 and the printer unit 197, flows into the system bus 181 through the digital I/F unit 193 and the I/O control unit 187. An image processing unit 191 performs correction/processing/edition on input and output image data. An image rotation unit 192 performs the rotation of image data. An image compression/expansion unit 194 performs JPEG compression on multivalue image data and also performs compression/expansion, such as JBIG/MMR/MR/MH, on binary image data. A pixel density conversion unit 195 performs resolution conversion on the output image data.

The CPU 186 reads information about various operation mode setting, the print sheet number counter value, the component counter value representing an operating amount of a component, the operation log, the failure information, such as the service-call-errors/jams/alarms, stored in the storage memory 185. Then, the CPU 186 transmits the read information to the station monitoring apparatus 200 through the network I/F 189. Also, the CPU 186 outputs various information about the frequent occurrence of various kinds of jams and other conditions occurring in the copying machine 100 through the network I/F 189 to the outside.

Figure 5:
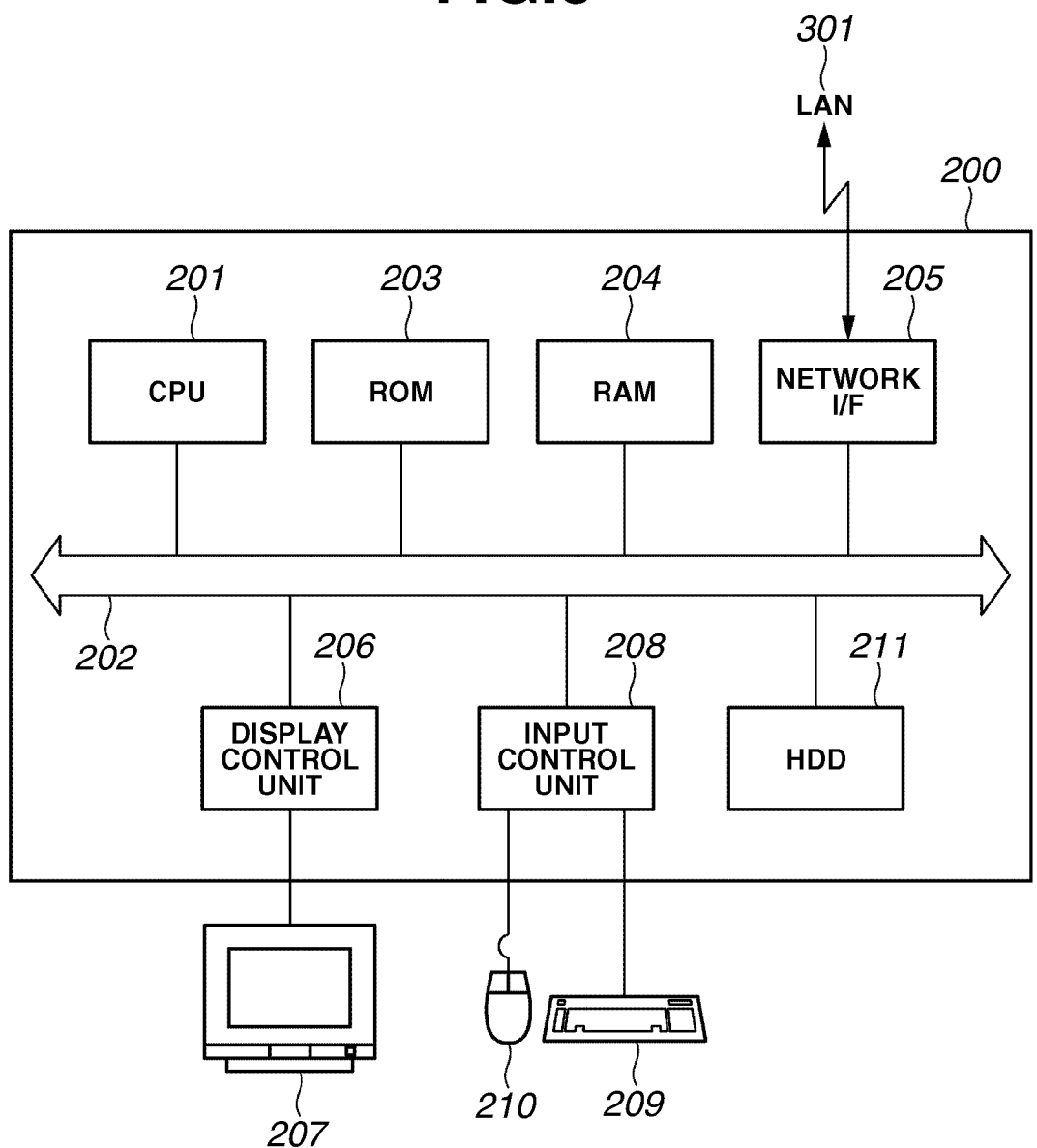
FIG. 5 is a block diagram illustrating an example of the station monitoring apparatus according to an embodiment of the present invention.

FIG. 5 is a block diagram illustrating the hardware configuration of the station monitoring apparatus 200 according to an exemplary embodiment of the present invention. An operation of the station monitoring apparatus 200 is described below with reference to FIG. 5.

The station monitoring apparatus 200 is configured such that a CPU 201, a ROM 203, a RAM 204, a Network I/F 205, a display control unit 206, an input control unit 208, and HDD 211 are connected to a system bus 202. A display device 207 is connected to the display control unit 206 and input devices 209 and 210 are connected to an input control unit 208.

The CPU 201 controls each of the components 202 to 211 according to a program stored in the HDD 211. The CPU 201 communicates with the copying machine 100 through the Network I/F 205 and a LAN 301 according to a preset communication schedule. The CPU 201 obtains operation mode setting information, a print sheet number counter value, a component counter value representing an operating amount of each component, an operation log, and failure information about service call errors/jams/alarms from the copying machine 100. Hereinafter, the above-described operating amount and the failure information are sometimes referred to as first operation information and second operation information, respectively. In the exemplary embodiment of the present invention, first operation information may include information relating to failures in an image forming apparatus, and second operation information may include information indicating that an image forming apparatus is operating normally and/or correctly. Then, the obtained information is initially stored in the HDD 211. Subsequently, the stored information is processed to generate data of the XML type data format that will be described later. Then, this data is transmitted from the Network I/F 205 through the LAN 301 to the monitoring host 310. At that time, the CPU 201 generally classifies the obtained information into two kinds of information, which are transmitted in different timing from each other to the monitoring host 310.

One of the two kinds of information is information relating to failures, such as the service call errors/jams/alarms generated in the copying machine 100, and a communication failure caused between the station monitoring apparatus 200 and the copying machine 100. Because such information requires immediacy, the station monitoring apparatus 200 transmits such information to the monitoring host 310 immediately after the information is obtained.

The another kind of information includes information about the setting of various operation modes, the print sheet number counter value, the component counter value representing the operating amount of each component, and the operation log. Such a kind of information is periodically transmitted from the station monitoring apparatus 200 to the monitoring host 310 according to a predetermined communication schedule.

Figure 6:
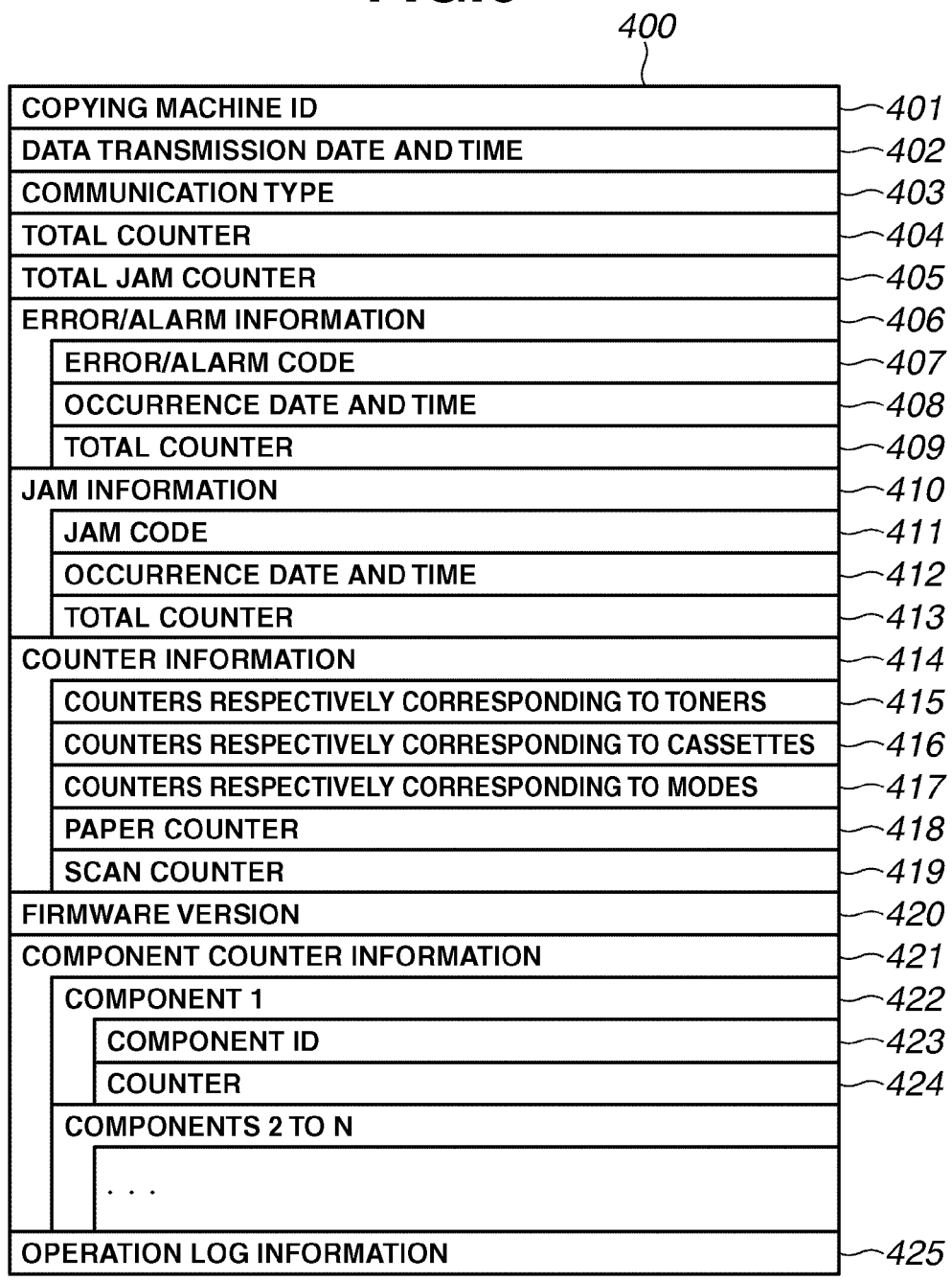
FIG. 6 is a diagram illustrating an example of the data format of information notified from the station monitoring apparatus or from the image forming apparatus to a monitoring host according to an embodiment of the present invention.

FIG. 6 is a diagram illustrating an example of the XML type data format used by the station monitoring apparatus 200 to transmit various information obtained from the copying machine 100 serving as an image forming apparatus to the monitoring host 310 according to an embodiment of the present invention. As described above, information of the format shown in FIG. 6 includes operation history information about the setting of the operation mode in the image forming apparatus 100, the print counter value representing the operating amount, the component counter value representing the operating amount of each component, and the operating log. The information of the format shown in FIG. 6 also includes various operation information, such as failure information representing service call errors, jams, and alarms.

In a case where the copying machine 100 serving as the image forming apparatus notifies the monitoring host 310 of information without going through the station monitoring apparatus 200, this figure illustrates an example of information of the data format transmitted from the copying machine 100 to the monitoring host 310.

A data format 400 schematically represents the structure of information. Each piece of information included in this table is actually described in the XML type form and is further encrypted. Thus, the encrypted information is transmitted from the station monitoring apparatus 200 to the monitoring host 310 as e-mail data.

A copying machine ID 401 is preliminarily assigned to the copying machine so as to uniquely specify (identify) each of the individual copying machines 100. Data representing the data transmission date and time 402 represents the date and the time, at which an e-mail is transmitted from the station monitoring apparatus 200 to the monitoring host 310.

Communication type information 403 represents an identifier that indicates whether this communication is periodic or non-periodic. A "total counter" value 404 represents a counter value representing a total number of printed sheets or printed pages from a moment, at which the copying machine 100 starts to operate, to a current point of time. A total jam counter 405 represents a total number of times of occurrences of jams. Error/alarm information 406 includes an error/alarm code 407 representing description of the error/alarm that occurs, information representing the date and time 408 of the occurrence, and a total counter value 409 at the time of occurrence of the error/alarm.

Jam information 410 includes a jam code 411 uniquely representing a place, at which a jam occurs, in the copying machine 100, information representing the date and the time 412 at the occurrence of the jam, and a "total counter" value 413 at the time of occurrence of the jam. In the case of periodical communication from the station monitoring apparatus 200 to the monitoring host 310, the error/alarm information 406 and the jam information 410 are omitted.

Counter information 414 represents a counter value obtained by counting print sheet number counter value of the copying machine 100 from various points of view. The counter information 414 includes counters 415 respectively corresponding to kinds (types) of toners (C/M/Y/K) used to print. Also, the counter information 414 includes counters 416 respectively corresponding to kinds (types) of feeding cassettes, counters 417 respectively corresponding to kinds (types) of printing operation modes (color/monochrome/single-side printing/two-side printing/print), and counters 418 respectively corresponding to kinds (types) of paper. Also, the counter information 414 includes a scan counter 419 representing the number of times of scanning performed by the copying machine 100. Firmware version information 420 represents the version of control software for the copying machine 100. Component counter information 421 represents a counter value indicating an operating amount of each kind of a mechanism unit held in the copying machine 100, for example, the number of revolutions (rotations) of the photoreceptor drum 111, the number of times of turning-on the original illuminating lamp 103, the number of times of feeding sheets by the roller 129 and the ejection roller 136, and the number of times of operations of the Z-folding device 165. Component counter values respectively corresponding to kinds (types) of mechanism components are stored separately each having a format 422. Reference numeral 423 represents a component ID used to uniquely specify each mechanism component. Reference numeral 424 represents a component counter value corresponding to the component ID. Operation log information 425 includes a user operation log and a debug log generated by a control software, which are held in the copying machine 100.

Figure 7:
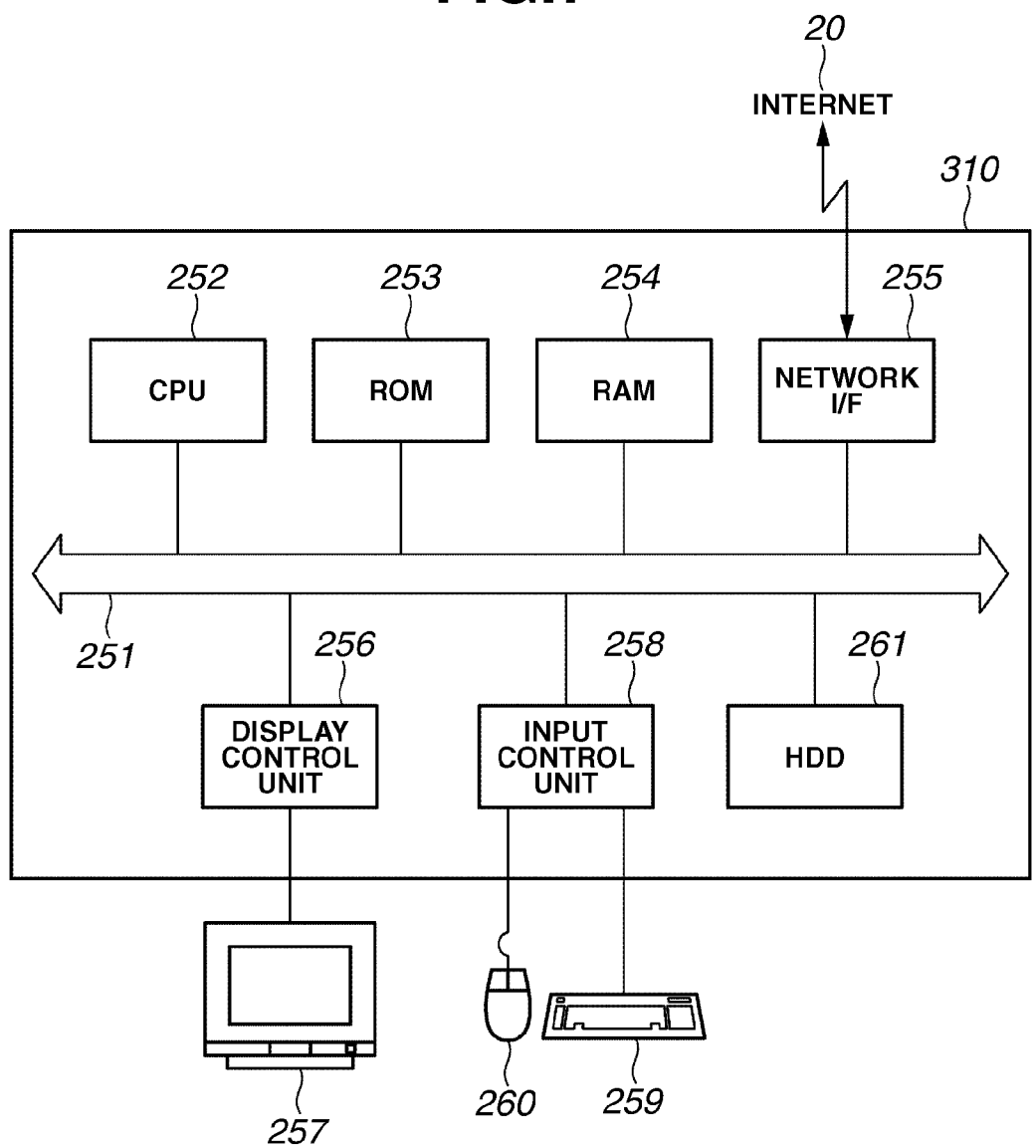
FIG. 7 is a block diagram illustrating an example of the monitoring host according to an embodiment of the present invention.

FIG. 7 is a block diagram illustrating the hardware configuration of the monitoring host 310 according to an exemplary embodiment of the present invention.

The monitoring host 310 includes a CPU 252 used to control the entire monitoring host 310, and a ROM 253 serving as a read-only memory storing a boot program needed to start up the system. Also, the monitoring host 310 includes a RAM 254 serving as a work memory needed when the program is executed in the CPU 252. Also, the monitoring host 310 includes a Network I/F unit 255 used to communicate with the station monitoring apparatus 200 and with a PC provided in the sales company intranet through the Internet 20. The monitoring host 310 is configured such that a display control unit 256, an input control unit 258, and a HDD 261 are connected to a system bus 251. The HDD 261 stores a program to be executed in the CPU 252, and information about the operating condition of each of the copying machines 100 sent from the station monitoring apparatus 200. A display device 257 is connected to the display control unit 256. Input devices 259 and 260 are connected to the input control unit 258. An operator supervising the monitoring host 310 checks the operating condition of the monitoring host 310 and instructs an operation thereof through the input/output devices.

The monitoring host 310 constantly or periodically receives information transmitted from the station monitoring apparatus 200 through the Network I/F 255 and the Internet 20, as described above. Then, the monitoring host 310 demodulates the received information, performs a parsing process on the demodulated XML data and stores resultant data in the HDD 261. In the monitoring host 310, a WWW (World Wide Web) server program operates. The information stored in the HDD 261 is displayed in a Web window. Consequently, a serviceman of the sales company can access the WWW server in the monitoring host 310 by using a Web browser on the PC provided in the sales company intranet environment 30. Also, this access enables the serviceman to browse the information stored in the HDD 261 of the monitoring host 310 from the sales company intranet environment 30.

The information, which the monitoring host 310 periodically receives from the copying machine 100 through the station monitoring apparatus 200 or without going through the station monitoring apparatus 200, includes the information about the setting of each operation mode, the print sheet number counter value, the component counter value representing the operating amount of each component, and the operation log, as described above.

Among these kinds of information, especially, the print number counter value according to the exemplary embodiment of the present invention is managed being stored in the HDD 261 functioning as a database. The table shown in FIG. 8 is stored in the HDD 261 of the monitoring host 310 corresponding to each of the image forming apparatus or each user. Similarly, tables shown in FIGS. 9, 10, 14, and 15 are stored therein corresponding to each of the image forming apparatuses or each user.

Total counter history tables 800 are provided corresponding to the copying machine IDs, respectively. The print number counter values are stored in the total counter history table 800 corresponding to the copying machine ID 401 in the data format 400 shown in FIG. 6. In a history field 801, an identification number automatically assigned by the monitoring host 310 is stored so as to uniquely specify each history record. In an acquisition date-and-time field 802 and a total counter value field 803, the data transmission date and time 402 and the total counter value 404 recorded in the data format 400 shown in FIG. 6, are stored, respectively.

FIG. 9 illustrates an example of a total counter history table 900 managed in the monitoring host 310 according to the exemplary embodiment of the present invention. The component counter values are stored in component counter history tables 900 in the HDD 261 of the monitoring host 310 functioning as a database. The component counter history tables 900 are respectively provided corresponding to the copying machine IDs and to the component counter IDs. The component counter values are stored in the component counter history table 900 corresponding to the copying machine ID 401 and the component ID 423 in the data format 400 shown in FIG. 6. In the history field 901, an identification number automatically assigned by the monitoring host 310 is stored so as to uniquely specify each of the history records. The data transmission date and time 402, and the component counter 424 in the data format 400 shown in FIG. 6, are stored in the acquisition date-and-time field 902 and the component counter value field 903, respectively.

Meanwhile, the information, which the monitoring host 310 periodically receives from the copying machine 100 through the station monitoring apparatus 200 or without going through the station monitoring apparatus 200, includes the information about the failures, such as the service call errors/jams/alarms occurring in the copying machine 100, and also includes the failure of the communication between the station monitoring apparatus 200 and the copying machine 100.

Failure history tables relating to various failures are stored in the database (HDD 261) managed by the monitoring host 310. FIG. 10 shows as an example of a jam history table 550 managed in the monitoring host according to an embodiment of the present invention.

The jam history tables 550 are provided corresponding to the copying machine IDs, respectively. Jam information is stored in the jam history table 550 corresponding to the copying machine ID 401 in the data format 400 shown in FIG. 6.

In the history field 551, the identification number automatically assigned by the monitoring host 310 is stored so as to uniquely specify each of the history records.

The jam history table 550 further includes a jam code field 552, an occurrence date-and-time field 553, and the total counter value field 554. The information obtained from the jam code field 411, the occurrence data-and-time field 412, and the total counter value field 413 of the data format 400 shown in FIG. 6 are stored in the jam code field 552, the occurrence date-and-time field 553 and the total counter value field 554, respectively, of the jam history table 550.

Figure 11:
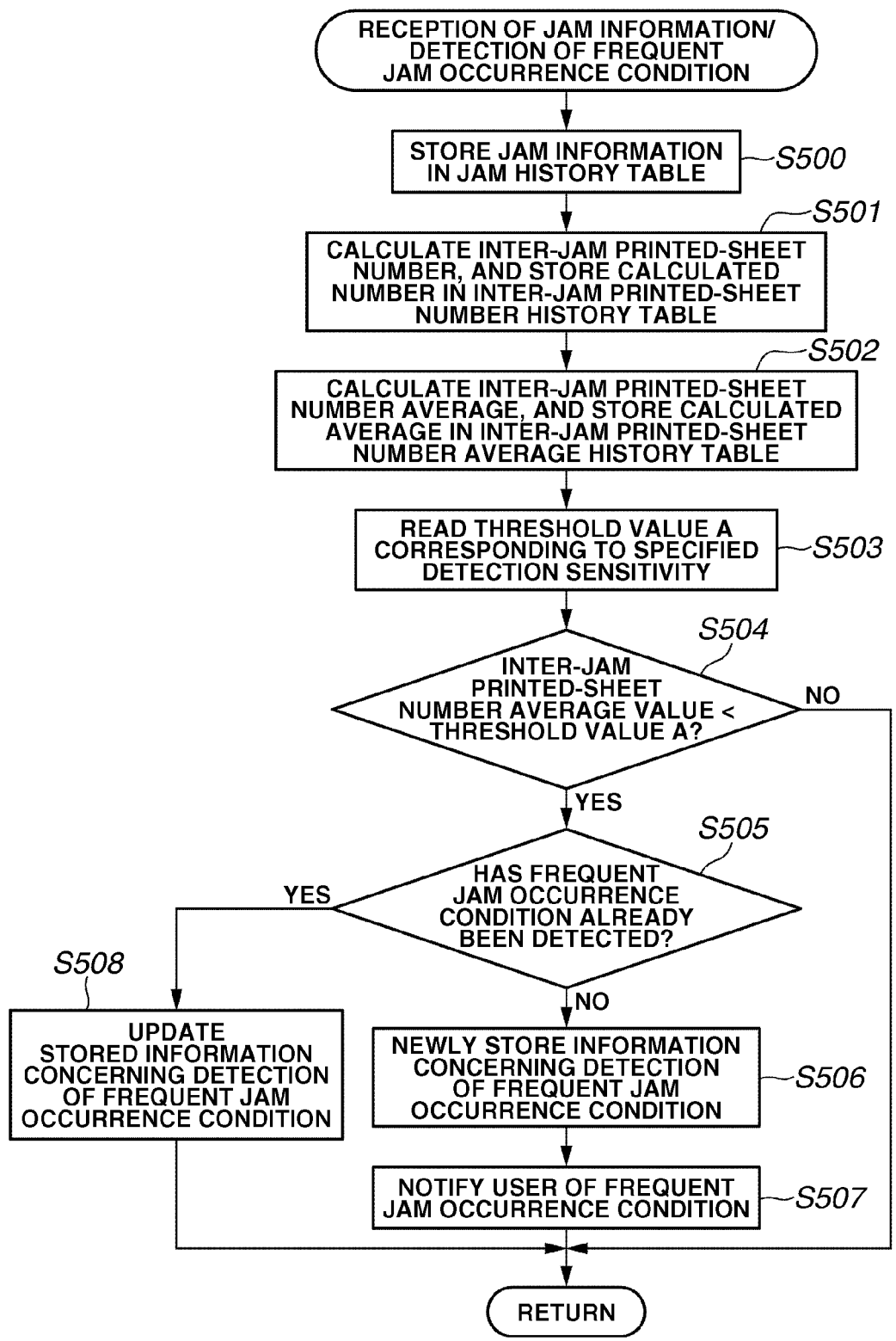
FIG. 11 is a flowchart illustrating a process of detecting a frequent failure occurrence condition according to an exemplary embodiment of the present invention.

FIG. 11 is a flowchart illustrating a process of detecting a frequent failure occurrence condition according to an exemplary embodiment of the present invention. An operation of detecting a frequent failure occurrence condition performed by the monitoring host 310 is described below with reference to FIG. 11.

When the monitoring host 310 receives jam information, which is an example of the first operation information, from the copying machine 100 through the station monitoring apparatus 200 or without going through the station monitoring apparatus 200, the monitoring host 310 enters a process flow shown in FIG. 11. The monitoring host 310 is capable of monitoring a plurality of image forming apparatuses, and performing the process shown in the flow chart shown in FIG. 11 corresponding to each of the plurality of the image forming apparatuses.

First, in step S500, the received jam information is stored in the jam history table 550, as described above. Subsequently, in step S501, jam information received at the immediately preceding stage is read from the jam history table 550. Then, the difference in total counter value between the jam information received at this time and the jam information received at the immediately preceding stage is calculated.

Then, the calculated value is stored as an inter-jam printed-sheet number in an inter-jam printed-sheet number history table 600 shown in FIG. 14. Subsequently, the average value of the inter-jam printed-sheet numbers is computed in step S502 according to the inter-jam printed-sheet numbers calculated in step S501. Then, the computed average value is stored in an inter-jam printed-sheet number average history table 700 shown in FIG. 15. This table is provided corresponding to each of the image forming apparatus or to each of the users. In an exemplary embodiment, this table is stored in the HDD 261 of the monitoring host 310.

Exemplary preset values 701 shown in FIG. 15 represent a modulus and a threshold value used for computing an inter-jam printed-sheet number average value that is used for determining whether a frequent jam occurrence condition is present. These values are preliminarily stored in the HDD 261 of the monitoring host 310 and referred to by a program.

The modulus represents the number of pieces of the inter-jam printed-sheet, the average of which is to be calculated. In this embodiment, the modulus is set to be 4. Thus, when the inter-jam printed-sheet number average value at one time is calculated, a total of the inter-jam printed-sheet numbers obtained at the past four times is computed. Then, the computed total is divided by 4.

For instance, when the inter-jam printed-sheet number average value corresponding to (5) of FIG. 15 is to be obtained, a total of the inter-jam printed-sheet numbers respectively corresponding to (2) to (5) is calculated. Then, the calculated total of the inter-jam printed-sheet numbers is divided by 4. The value obtained in this way is stored in the inter-jam printed-sheet number average history table 700. The inter-jam printed-sheet number average values corresponding to (1) to (4) shown in FIG. 15 are not calculated, because the number of the inter-jam printed-sheet numbers is less than 4.

Subsequently, according to the inter-jam printed-sheet counter calculated in step 502, it is determined (or detected) in step S503 and S504 whether or not a frequent jam occurrence condition is present.

The reason for making the determination according to the average value is that a frequent jam occurrence condition accidentally caused in the copying machine 100 should be prevented from being detected as much as possible. Accidental jams or failures maybe caused by a number of factors, including, an improper use or handling of the image forming apparatus by a user.

Even in the case of the copying machine 100, in which no failure occurs, a few consecutive jams may occur due to a user operation. In a case where the determination is made according to the inter-jam printed-sheet number, a frequent jam occurrence condition may be unduly detected.

The influence of accidental jams can be alleviated by using the inter-jam printed-sheet average value. Meanwhile, as indicated in the set value field 701 shown in FIG. 15, the threshold value includes a threshold value A and a threshold value B. The threshold value A is used to detect a frequent jam occurrence condition. The threshold value B is used to detect the resolution of a frequent jam occurrence condition, which will be described later. Also, the detection sensitivity (High/Standard/Low), at which a frequent jam occurrence condition is detected, can be designated by an operation performed by a user of a sales company, which will be described later. Different threshold values are preliminarily stored corresponding to each detection sensitivity.

Incidentally, the sensitivity is defined herein. If the occurrence of many jams can be detected when jams frequently occur (for example, a jam occurs every 200 sheets on average), and if the occurrence of many jams cannot be detected when jams do not frequently occur (for instance, a jam occurs every 800 sheets on average), the sensitivity is defined to be low. Meanwhile, if the occurrence of many jams can be detected even when jams do not frequently occur (even in a case that a jam occurs every 800 sheets on average), the sensitivity is defined to be high. In a case where the sensitivity corresponding to the threshold A is High, as shown in FIG. 15, even when the inter-jam average number is 800 so that a symptom is small, the frequent occurrence of jams can be detected. On the other hand, in a case where the sensitivity of the threshold A is Low, the frequent occurrence of jams cannot be detected unless the inter-jam average number is 200 so that a symptom is large. Such a sensitivity can be appropriately changed and set according to the use condition of the image forming apparatus, to the purpose of use thereof and to a user's intended purpose of printing.

In accordance with an exemplary embodiment of the present embodiment, the detection sensitivity may be selected by a user of the sales company to, for example, "Standard" (the threshold value A=500, and the threshold value B=600).

Also, in an exemplary embodiment of the present invention, the threshold value B is set to be larger than the threshold value A, with the intention of detecting the resolution of a frequent jam occurrence condition more surely. This is also a feature contrived by an exemplary embodiment of the present embodiment.

In step S503, the threshold value A corresponding to the detection sensitivity preliminarily designated by a user in the sales company is read from the set value field 701. Subsequently, in step S504, it is determined if the inter-jam printed sheet number average calculated in step S502 is less than the threshold value A read in step S502. It is assumed that each set of the threshold values A and B is stored in the HDD 261 as a database of the monitoring host 310 corresponding to each of the image forming apparatuses or to each user.

In a case where the inter-jam printed-sheet number average value is equal to or higher than the threshold value A (S504, No), the system exits from this process flow and waits for newly receiving jam information from the station monitoring apparatus 200.

In a case where the inter-jam printed-sheet number average value is lower than the threshold value A (S504, Yes), it is determined if the copying machine 100 is in a frequent jam occurrence condition. Thus, the system advances to the next step S505. More specifically, in the example illustrated in FIG. 15, when the jam information from the jam history field (9) is received, the inter-jam printed sheet average number is 425, which is lower than the threshold value, 500.

In step S505, it is determined whether or not a frequent jam occurrence condition has already been detected in the past. More specifically, in step S505, whether or not the frequent jam occurrence information is already recorded is determined by referring to the frequent jam occurrence information stored in the HDD 261 corresponding to each of the image forming apparatuses. If already detected, the frequent jam occurrence information detected this time is stored as the latest frequent jam occurrence information in the HDD 261. On the other hand, if the frequent jam occurrence information is newly detected, the frequent jam occurrence information detected this time is newly stored in the HDD 261 in step S506. Also, the frequent jam occurrence condition is distinguishably (explicitly) indicated by an icon 658 shown in FIG. 17, which will be described in more detail below, when the frequent jam occurrence condition is recorded in the HDD 261 in step S506. Then, in step S507, the system notifies the user in the sales company of the detection of a new frequent jam occurrence condition by an e-mail. Then, the system exits from this process flow. Outputting of the e-mail is performed by the Network Interface 255 described with reference to FIG. 7.

FIG. 16 shows an example of the e-mail notified to the user in the sales company, which distinguishably (explicitly) shows that an image forming apparatus is in the condition of a frequent jam occurrence. The method of notifying the frequent jam occurrence condition is not limited to the e-mail.

At the end of the body of the e-mail, a URL used to access a jam graph window (to be described later) is described. When the user in the sales company receives the e-mail, he/she accesses a WWW server provided in the monitoring host 310 by using this URL from a Web browser on the PC in the sales company intranet environment 30. Thus, the user can browse the jam graph window (to be described later).

FIG. 17 is a diagram illustrating an example of display of the jam graph window according to an embodiment of the present invention. For example, in a case where the serviceman causes a display terminal to display the window shown in FIG. 17 by using the browser, the monitoring host 310 outputs HTML data to the display terminal through the network interface 255.

Reference numeral 651 in this figure indicates information about a client who owns a copying machine 100 in which a jam occurs. Reference numeral 652 indicates information about the contract concluded between the client, who owns the copying machine 100 in which a jam occurs, and the sales company. Reference numeral 653 indicates information about the station monitoring apparatus 200 that monitors the copying machine 100 in which a jam occurs. Reference numeral 658 designates an icon indicating whether the copying machine 100 is in a frequent jam occurrence condition. In a case where a frequent jam occurrence condition is present, this icon is turned on in red. A warning color is not limited to red. Other colors can be employed. The indication 658 reflects the storage process performed in step S506 and the update process performed in step S508, as described above. Reference numeral 655 denotes a jam graph obtained by drawing a graph according to the inter-jam printed sheet number history table.

The user in the sales company can visually check a jam occurrence situation from this jam graph until a frequent jam occurrence condition appears. A list box 656 is a menu used to set the sensitivity (High/Standard/Low) when a frequent jam occurrence condition is detected in the monitoring host 310. The user in the sales company can designate a desired detection sensitivity by operating this menu. A list 654 is a list display of the jam history table 550, and shows the serial No. of the copying machine 100, the product name, a place, at which a jam occurs, the size of paper when a jam occurred, the location of a paper feeding place, and a total counter value.

A bar chart 657 shows the value (the number of printed sheets) indicated by a counter when an printing output is continuously performed in a case where no jam occurs after the last occurrence of a jam. For example, the user in the sales company sees this bar chart to confirm that the resolution of the frequent jam occurrence condition is performed (the frequent jam occurrence condition is fixed), and that a printing operation is continuously and normally performed. The bar chart 657 can be modified to show a period of time during which a printing output operation is continuously and normally performed in a case where no jam occurs after the last occurrence of a jam.

Figure 12:
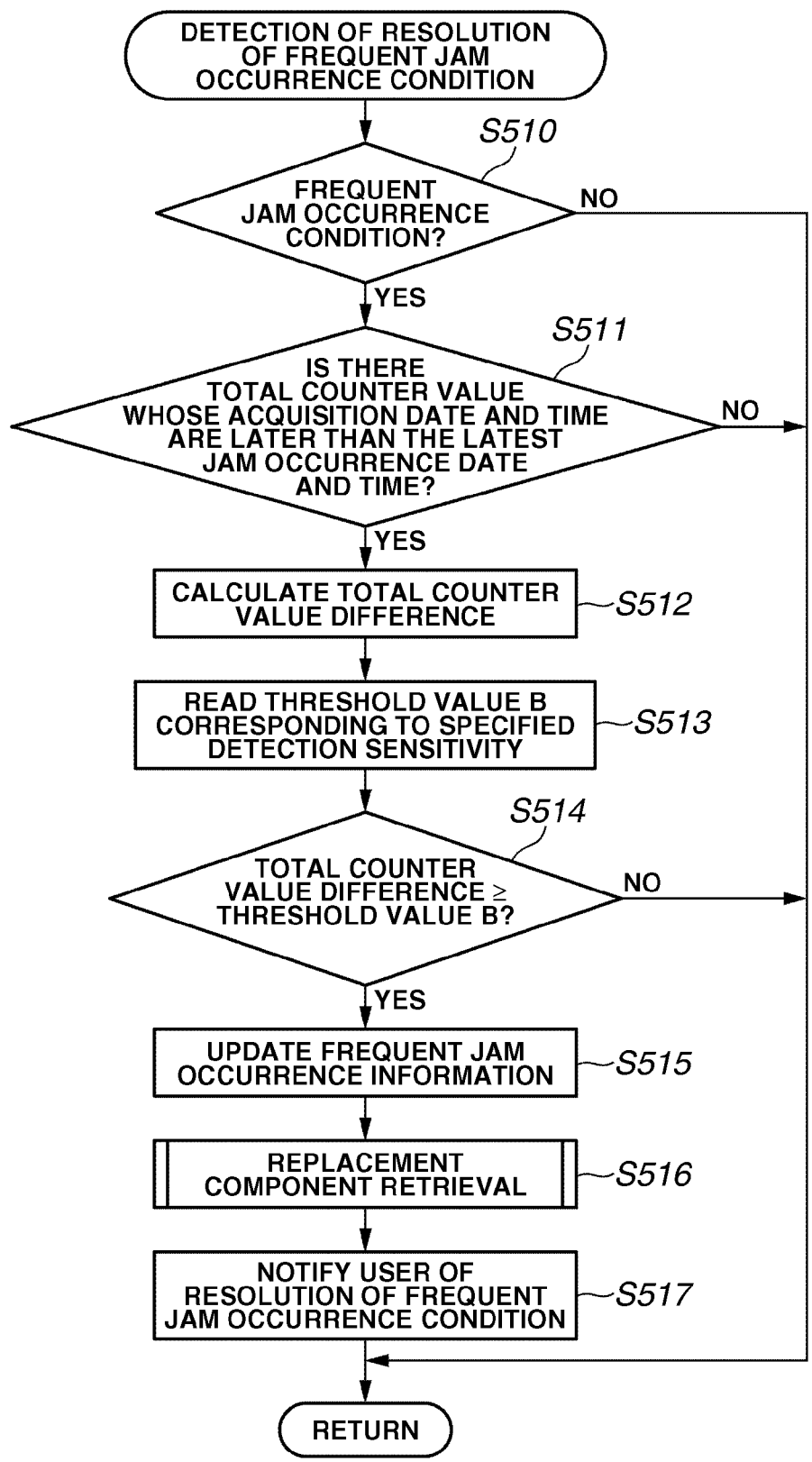
FIG. 12 is a flowchart illustrating a process of detecting the resolution of the frequent failure occurrence condition according to an exemplary embodiment of the present invention.

FIG. 12 is a flowchart illustrating a process of detecting the resolution of the frequent jam occurrence condition according to an exemplary embodiment of the present invention. An operation of detecting the resolution of a frequent jam occurrence condition performed by the monitoring host 310 is described below with reference to FIG. 12. Actually, the monitoring host 310 is capable of monitoring a plurality of image forming apparatuses and performing the process illustrated in the flowchart shown in FIG. 12 to each of the plurality of image forming apparatuses.

The monitoring host 310 is adapted to detect the resolution of a frequent jam occurrence condition by periodically executing the process illustrated in FIG. 12. When executing the process, first, the monitoring host 310 searches for frequent jam occurrence information stored in the HDD 261 in step S510 to determine whether there is any copying machine 100 put in a frequent jam occurrence condition.

If there is no copying machine 100 in a frequent jam occurrence condition (S510, No), the host exits from the process shown in the process flow. If there is a copying machine 100 in a frequent jam occurrence condition, the monitoring host 310 reads the latest jam history stored in the jam history table 550 corresponding to this copying machine 100 in step S511.

Then, the monitoring host 310 searches the total counter history table 800 corresponding to this copying machine 100 according to the occurrence date and time recorded in the latest jam history. Thus, the monitoring host 310 checks whether there is a total counter history obtained after the date and the time when a jam occurred.

If there is no corresponding total counter history (S511, No), the host exits from the process. If there is a corresponding total counter history (S511, Yes), the monitoring host 310 calculates the difference (hereunder referred to as a total counter value difference) between a total counter value 554 corresponding to the latest jam history and a total counter value 803 corresponding to the latest total counter history in step S512. Subsequently, in step S513, the monitoring host 310 reads from the set value field 701 the threshold value B corresponding to the detection sensitivity previously designated by the user in the sales company. Then, in step S514, the monitoring host 310 determines if the total counter value difference calculated in step S512 is greater than the threshold value B read in step S513. If the total counter value difference is less than the threshold value B (S514, No), the host exits from the process shown in the flowchart. If the total counter value difference is equal to or larger than the threshold value B (S514, Yes), the monitoring host 310 determines that the frequent jam occurrence condition is resolved (the frequent jam occurrence condition is fixed). Thus, the monitoring host 310 advances to the next step S515. More specifically, when the processing corresponding to step S514 is performed after receiving the print number counter corresponding to the total counter history number "018112", the total counter value difference is 620 and is larger than the threshold value B that is 600. The processing performed in step S514 enables the accurate detection (or recognition) of the resolution of the frequent jam (or failure) occurrence condition, instead of the simple resolution of the individual jams (or failures). Also, this processing performed in step S514 detects whether the frequent jam occurrence condition is resolved (fixed), based on the operation history information, such as the print counter value in the image forming apparatus, the component counter value representing an operating amount of each component, and an operation log (examples of the second operation information), instead of the failure information (an example of the first operation information). That is, in the processing in step S514, the operation history information can be a trigger of performing the detection of the resolution of the frequent jam occurrence condition. The "trigger" means a clue for detection, or inducement. According to the related technique of simply detecting a highly frequent jam occurrence condition, the frequency of occurrence of a jam is detected based on only the occurrence of a jam. Thus, the resolution of a frequent jam occurrence condition cannot be detected. Therefore, even in a case where a jam accidentally occurs, the resolution of a frequent jam occurrence cannot be notified to a serviceman. Consequently, the serviceman may misunderstand that a frequent jam occurrence condition is present. Thus, the serviceman may visit a user by mistake. In contrast, the processing corresponding to step S514 can prevent an occurrence of such a situation.

In step S515, the frequent jam occurrence information corresponding to the associated copying machine 100, which is stored in the HDD 261, is deleted (that is, the frequent jam occurrence information corresponding to the associated copying machine 100 is rewritten to frequent jam occurrence resolution information). According to the updated frequent jam occurrence information, it is possible to output a display indicating whether the resolution of a frequent failure occurrence condition is achieved. An example of an output is the icon 658 described in the foregoing description.

Subsequently, in a replacement component search process in S516, the monitoring host 310 searches for a component replaced in the associated copying machine 100 in a time from the last appearance of the frequent jam occurrence condition to the resolution thereof. Hereunder, the time from the last appearance of the frequent jam occurrence condition to the resolution thereof is sometimes referred to as a frequent failure occurrence time.

Figure 13:
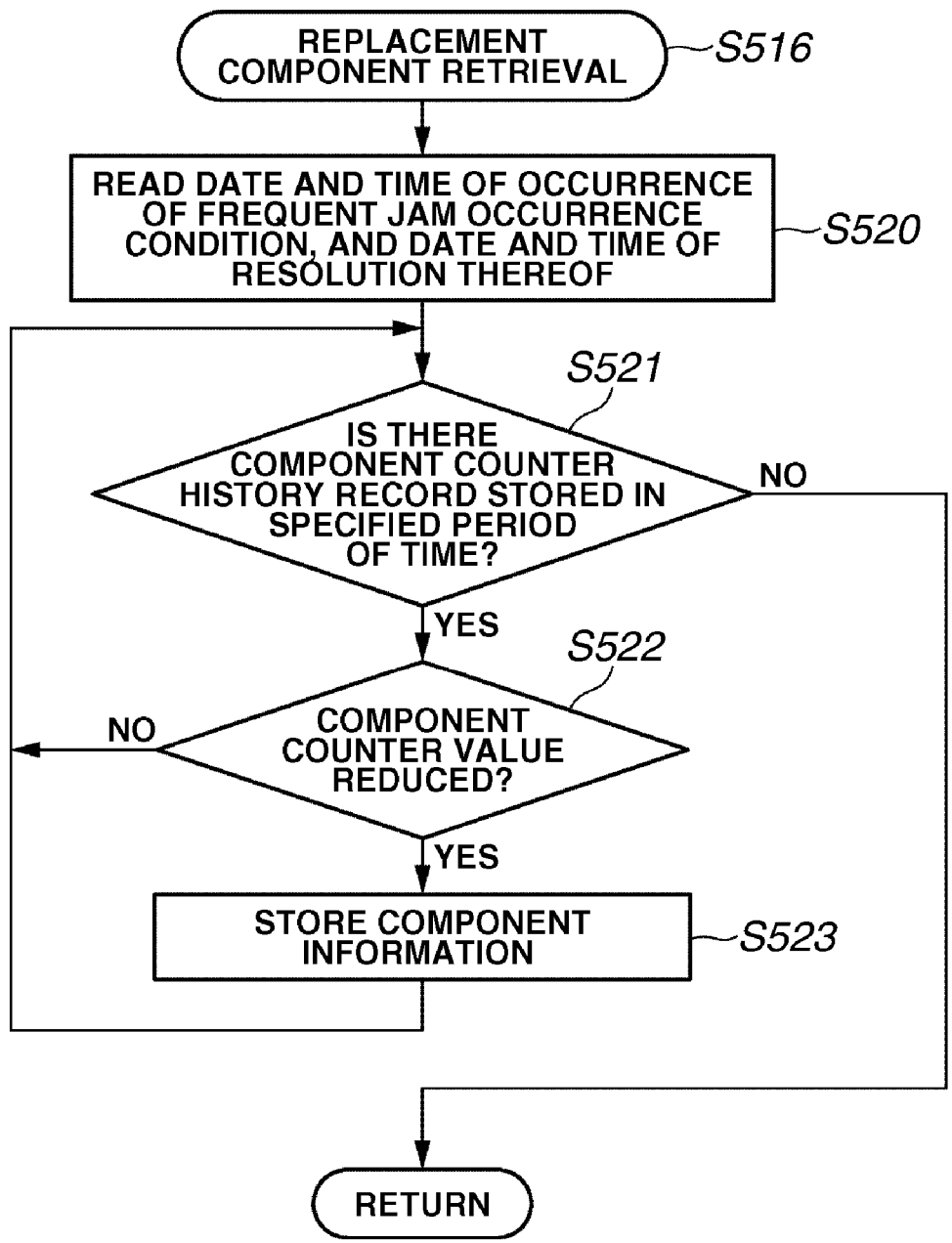
FIG. 13 is a flowchart illustrating the details of the replacement component search process, performed in step 516 of FIG. 12, according to an embodiment of the present invention.

FIG. 13 is a flowchart illustrating in detail the replacement component search process, performed in step 516 of FIG. 12, according to an embodiment of the present invention. In a case where component replacement is performed in the copying machine 100, the component counter value corresponding to the replaced component is reset to 0. Thus, the monitoring host 310 can detect the occurrence of the component replacement by checking change in all component counter values 903 stored in the entire component counter history table 900 corresponding to the associated copying machine 100, as shown in FIG. 9.

First, in step S520, the monitoring host 310 reads the latest frequent jam occurrence condition resolution information and the frequent jam occurrence information preceding immediately thereto to specify a time from the appearance of the frequent jam occurrence condition to the resolution thereof. In one illustrated example, this time is "2004/12/27 12:58 to 2004/12/28 13:40". Subsequently, in step S521, the monitoring host 310 searches the component counter history table 900 for the component counter history records (that is, records represented by lateral lines that are designated by numerals, such as "018110", shown in FIG. 9) within the time.

If there is such a component counter history record, the monitoring host 310 makes comparison between the counter value corresponding to the counter history record and the counter value corresponding to the immediately preceding component counter history record in step S522. If the monitoring host 310 determines as a result of the comparison that the counter value is decreased, the host 310 causes both the RAM 254 and the HDD 261 in step S523 to temporarily store the component information. Information about a replacement component is distinguishably stored to show that this component was replaced (which includes both an old component to be replaced with a new one and the replaced new one). Also, information about the replacement component includes information representing the kind (or model) of the replacement component (for example, kinds of parts such as the ejection roller, or the photoreceptor drum) and identification information used to uniquely identify the replacement component. According to the information representing the kind or model of the replacement component, the monitoring host 310 can determine which kind or model of the replacement component brought the resolution of a frequent jam occurrence. Also, according to the individual identification information, the monitoring host can identify what individual component is a failure one.

In the illustrated example, the component counter value corresponding to the history number "018113" decreases from that corresponding to the history number "018112". Thus, the monitoring host 310 can detect that the associated component was replaced in this time. As described above, in the exemplary scenario illustrated with respect to the figures, the time from the appearance of the frequent jam occurrence condition to the resolution thereof is determined to be "2004/12/27 12:58 to 2004/12/28 13:40". Also, the component replacement was performed from "2004/12/27 13:40 to 2004/12/28 13:40. Thus, it can be determined that this component was replaced in the time from the appearance of the frequent jam occurrence condition to the resolution thereof. Then, information about the component determined to be replaced is stored in both of the RAM 254 and the HDD 261. The information stored in the RAM 254 is utilized for a notification process to be described later. The information stored in the HDD 261 serving as a database is utilized for holding the history. Although the component information held in the HDD 261 is not shown, the information representing the kind and the individual identifier of the component determined to have been replaced is stored to correspond to timing with which the resolution of the frequent jam occurrence condition was achieved. In a case where the stored data is outputted to the exterior or is displayed, the component information corresponding to the resolution of the frequent jam occurrence condition can be presented or indicated to a user.

If the monitoring host 310 determines in step S522 that the counter value is not decreased (S522, No), or if the processing in step S523 is finished, the host returns to step S521. The monitoring host 310 searches the component counter history table 900 for the next component counter history. The process including step S521 to step S523 is performed on the entire component counter history corresponding to the associated copying machine 100. Thus, the monitoring host 310 searches for all of the corresponding components.

Finally, referring back to FIG. 12, in step S517, the monitoring host 310 outputs information distinguishably (explicitly) representing the detected resolution of a frequent failure occurrence condition to notify a user of the fact that the resolution of the frequent failure occurrence condition is detected. More specifically, for instance, the monitoring host 13 creates an e-mail enabling a user to appreciate that the resolution of the frequent failure occurrence condition is detected. Then, the monitoring host 13 sends the created e-mail to the user belonging to the sales company. Subsequently, the monitoring host 310 exits from the process shown in this flow chart. At that time, the component information temporarily stored in the RAM 254 in step S523 is added to the e-mail. The method of notifying the resolution of the frequent jam occurrence condition by the monitoring host 310 is not limited to the e-mail notification. Alternatively, the information representing the resolution of the frequent jam occurrence condition can appreciably be displayed on the screen of a monitor for an operator at the monitoring host 310. It has been described in step S522 that the presence of the component replacement history record in the predetermined time is determined according to the decrease in the component counter value 903. However, the manner of determining the presence/absence of the component replacement history record according to the present invention is not limited thereto. For example, in a case where the component replacement history can be held in a memory of the copying machine, and where the monitoring host 310 can acquire the component replacement history information including information on the replacement date and time, the monitoring host 310 can determine the component replacement according to the acquired component replacement history information. More specifically, in this case, the monitoring host 310 can determine whether there is a component replacement history record representing a component replacement in the time from the last appearance of the frequent jam occurrence condition to the resolution thereof.

FIG. 18 shows an example of an e-mail notified to the user belonging to the sales company according to an embodiment of the present invention. In the body of the e-mail, information concerning the replacement component searched in step S516 is described. FIG. 18 shows the kind of the component (that is, the component No. and the component name), whereas the individual identification number or information is not shown in this figure. However, the e-mail notification can be adapted to include the individual identification number or information uniquely identifying the individual component. Also, at the end of the body of the e-mail, a URL used to access the jam graph window is described. In a case where the user, who belongs to the sales company and has received the e-mail, browses the jam graph screen using this URL, the icon 658 in the jam graph window is turned off since the resolution of the frequent jam occurrence has already been achieved.

The table shown in FIG. 18 includes the component replacement history. However, in a case where the replacement component cannot be searched for in step S516, the notification includes no information concerning the replacement component.

Although in the foregoing description, a jam is employed as an example of a failure, the failure occurring in the embodiment is not limited thereto. The embodiment can be applied to various failures, such as a "memory over" error. Also, similar advantages can be obtained even when the embodiment of the present invention is applied to occurrences of various other failures.

As described above, the embodiment of the present invention, which has been described in detail, can provide the system capable of precisely detecting the resolution of an occurrence of a jam or other failures.

Further, after the monitoring host 310 detects the appearance of the frequent jam occurrence condition, the resolution of the frequent jam occurrence condition can precisely be detected. Also, the appearance of the frequent jam occurrence condition can immediately be recognized by the user, such as the serviceman, in the sales company. Additionally, the user can confirm the resolution of the frequent jam occurrence condition in the screen. Consequently, the user belonging to the sales company can be prevented from performing unnecessary maintenance operations on the copying machine in which a frequent jam occurrence condition appears. Therefore, the enhancement of efficiency of the maintenance operation and the reduction in the maintenance cost can be achieved. Also, the history of the component replacement attended with the resolution of the frequent jam occurrence condition is held in the HDD 261. Thus, for instance, the cause of the appearance of the frequent jam occurrence condition can be analyzed according to the held replacement component history.

In the present embodiment, the monitoring host 310 receives information about the copying machine 100 through the station monitoring apparatus 200 provided in the client intranet environment 10. However, it is easy to implement the copying machine 100 including the functions of the station monitoring unit. The system can be configured by using such a copying machine so that the monitoring host 310 receives information directly from the copying machine 100. Even in a case where such a configuration is employed, the aforementioned techniques employed in the monitoring host 310 can similarly be realized, so that similar advantages can be obtained.

Second Exemplary Embodiment

In the foregoing description, the total counter value (the print number counter value) of the operating amount of the image forming apparatus is used as a parameter indicating whether the resolution of a frequent failure occurrence condition was performed. However, for example, some image forming apparatuses do not support the total counter notification. In such a case, the total counter value cannot be used as the parameter.

For instance, in such a case, the present embodiment can be configured such that a time is employed as the operating amount, instead of the total counter value. That is, in a case where a predetermined time has elapsed since the date and time of the latest occurrence of a jam, it can be determined to be YES in step S514 shown in FIG. 12. Thus, as compared with the case of using the total counter value as the parameter, the present embodiment can provide an advantage that the resolution of a frequent jam occurrence condition can be determined by a system having a simpler configuration.

Third Exemplary Embodiment

In the foregoing description of the embodiments, the resolution of a frequent jam occurrence condition is detected according to the continuous output of the second operation information (for example, the print counter value) outputted from the image forming apparatus even when no failure occurs therein. However, to achieve the purpose of explicitly outputting information to notify a serviceman of the resolution of a frequent jam occurrence condition, the resolution of a frequent jam occurrence condition may be detected according to reduction in the frequency of occurrences of failures (or jams). In this case, the frequency of occurrences of failures can be detected, for example, by counting the number of occurrences of the first operation information in a certain constant amount of the second operation information. Also, other frequency detection methods can be employed.

In the foregoing description of each of the above-described embodiments, the detection of the resolution of a frequent failure occurrence condition is triggered off (detected) by the fact that the second operation information is continuously acquired without occurrences of failures. However, the technique of detection of the resolution of a frequent failure occurrence condition is not limited thereto. For example, the monitoring host 310 can be configured to measure the frequency of occurrences of failures with timing, with which a certain amount of the second operation information can be acquired, even when a failure occurs in the past, and to output (or notify) information representing the resolution of a frequent failure occurrence condition to the outside.

Other Exemplary Embodiments

While various embodiments have been described above in detail, the present invention can be applied to an apparatus constituted by a single device or to an apparatus constituted by a plurality of devices, for example, a computer system including a printer, a facsimile machine, a PC, a server, and a client.

Embodiments of the present invention can be implemented by supplying a software program, which implements the functions of the foregoing embodiments, directly or indirectly to a system or an apparatus, and by causing a computer of the system to read the supplied program, and by executing the program code.

Accordingly, because the functions and processes according to the present invention are implemented by a computer, the program code itself installed in the computer also implements the present invention. That is, a computer program itself for implementing the functions and the processes according to the present invention is included within the scope of the present invention.

In such a case, as long as the system or the apparatus has the functions of the program, the program may be executed in any form, for example, an object code, a program executed by an interpreter, or script data supplied to an OS (Operating System).

Examples of recording-media for supplying the program include a flexible disk, a hard disk, an optical disk, a magneto-optical disk, an MO, a CD-ROM, a CD-R, and a CD-RW. Also, other examples of recording-media include a magnetic tape, a non-volatile memory card, a ROM, and a DVD (a DVD-ROM or a DVD-R).

Programs can be downloaded from a home page on the Internet by using a browser of a client computer. That is, the computer program according to the present invention itself or a compressed file of the program including an automatically installing function may be downloaded to a recording medium, such as a hard disk. Alternatively, the present invention can be implemented by dividing the program code, which constitutes the program according to the present invention, into a plurality of files and by downloading the files from different home pages. That is, a WWW (World Wide Web) server that downloads the program files, which implement the functions according to the present invention by a computer, to multiple users, may be a composing element of the present invention.

Further, the program according to the present invention can be encrypted. Then, the encrypted program can be stored in storage media, such as CD-ROMs. Subsequently, the storage media can be distributed to users. In this case, users, who meet certain requirements, can be permitted to download decryption key information from a home page on the Internet, and to decrypt the encrypted program by using the key information, so that the program is installed in the user computer.

Also, the functions according to the above-described embodiments can be implemented by executing the read program by a computer. An OS running on the computer can perform all or a part of the actual processing according to instructions from the program. Similarly, in this case, the functions of the embodiments can be implemented.

Additionally, the program read from the storage medium can be written to a functional expansion board inserted into the computer or to a memory provided in a functional expansion unit connected to the computer. According to instructions from the program, a CPU mounted on the functional expansion board or the functional expansion unit can perform all or apart of the actual processing. Similarly, in this case, the functions of the embodiments can be implemented.

In accordance with an exemplary embodiment of the present invention, the monitoring system can advantageously detect the resolution of an occurred jam or other failures. Also, after a frequent failure occurrence condition of the image forming apparatus is detected, the resolution of the frequent failure occurrence condition can be detected by using, for example, a notification outputted from the image forming apparatus other than a failure notification. Also, a result of the detection may be immediately notified to a user, such as a serviceman, in a sales company, and displayed so that the result can visually be checked on a screen. Thus, an unnecessary maintenance operation can be prevented in an image forming apparatus. This results in enhancement of efficiency in performing a maintenance operation and also results in reduction of maintenance cost.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-183271 filed Jun. 23, 2005 and Japanese Patent Application No. 2006-123781 filed Apr. 27, 2006, which are hereby incorporated by reference herein in its entirety.

What is claimed is:

1. An image forming apparatus monitoring system configured to monitor at least one image forming apparatus, comprising:

a reception unit configured to receive first operation information and second operation information concerning the image forming apparatus;

a storage unit configured to store the first operation information and the second operation information received by the reception unit;

a first detection unit configured to detect a frequent occurrence of failures in the image forming apparatus based on the first operation information;

a second detection unit configured to detect a resolution of the frequent occurrence of failures based on the second operation information;

an output unit configured to output information that explicitly indicates the resolution of the frequent occurrence of failures in response to the detection of the resolution of the frequent occurrence of failures;

a third detection unit configured to detect a component replaced in the image forming apparatus based on third operation information; and a storage control unit configured to cause a database to store information about the replaced component in an explicit form according to detection thereof by the third detection unit, wherein the third detection unit detects the component replaced in the image forming apparatus in a frequent failure occurrence time.

2. The image forming apparatus monitoring system according to claim 1, wherein first operation information and second operation information are notified from the image forming apparatus or from a station monitoring apparatus adapted to intermediate between the image forming apparatus and the image forming apparatus monitoring system.

3. The image forming apparatus monitoring system according to claim 1, wherein the output unit includes a notification unit configured to notify the resolution of the frequent occurrence of failures through a communication line, in a case where the resolution of the frequent occurrence of failures is detected by the second detection unit.

4. The image forming apparatus monitoring system according to claim 1, further comprising a setting unit configured to set a detection sensitivity of the first detection unit which detects the frequent occurrence of failures, or to set a detection sensitivity of the second detection unit which detects the resolution of the frequent occurrence of failures.

5. The image forming apparatus monitoring system according to claim 1, wherein the first operation information relates to a failure of the image forming apparatus, and wherein the second operation information relates to an operating amount of the image forming apparatus.

6. The image forming apparatus monitoring system according to claim 1, wherein the second operation information concerns the number of sheets printed in the image forming apparatus, or the number of print pages.

7. The image forming apparatus monitoring system according to claim 1, wherein the third operation information represents a component counter value.

8. A method to monitor at least one image forming apparatus, comprising:

receiving first operation information and second operation information concerning the image forming apparatus;

storing the first operation information and the second operation information received;

detecting a frequent occurrence of failures in the image forming apparatus based on the first operation information;

detecting a resolution of the frequent occurrence of failures based on the second operation information;

outputting information that explicitly indicates the resolution of the frequent occurrence of failures in response to the detection of the resolution of the frequent occurrence of failures;

detecting a component replaced in the image forming apparatus based on third operation information;

causing a database to store information about the replaced component in an explicit form in response to the detection of the replaced component; and detecting a frequent failure occurrence time associated with the replaced component.

9. The method according to claim 8, wherein the first operation information and the second operation information are received from the image forming apparatus or from a station monitoring apparatus in communication with the image forming apparatus.

10. The method according to claim 8, wherein the outputting comprises:

notifying the resolution of the frequent occurrence of failures through a communication line in response to the detection of the resolution of the frequent occurrence of failures.

11. The method according to claim 8, further comprising:
setting a detection sensitivity at which the frequent occurrence of failures is detected; and
setting a detection sensitivity at which the resolution of the frequent occurrence of failures is detected.

12. The method according to claim 8,
wherein the first operation information relates to a failure of the image forming apparatus, and
wherein the second operation information relates to an operating amount of the image forming apparatus.

13. The method according to claim 8, wherein the second operation information concerns the number of sheets printed in the image forming apparatus, or the number of print pages.

14. The method according to claim 8, wherein the third operation information represents a component counter value.

15. A machine-readable medium having stored thereon instructions which, when executed by a computer, causes the computer to perform a method comprising:

receiving first operation information and second operation information concerning an image forming apparatus;

storing the first operation information and the second operation information;

detecting a frequent failure occurrence condition in the image forming apparatus based on the first operation information;

detecting a resolution of the frequent occurrence of failures based on the second operation information;

outputting information that explicitly indicates the resolution of the frequent failure occurrence condition in response to the detection of the resolution of the frequent failure occurrence condition;

detecting a component replaced in the image forming apparatus based on third operation information;

causing a database to store information about the replaced component in an explicit form in response to the detection of the replaced component; and detecting a frequent failure occurrence time associated with the replaced component.

16. An image forming apparatus monitoring system configured to monitor at least one image forming apparatus, comprising:

a reception unit configured to receive first operation information and second operation information concerning the image forming apparatus;

a storage unit configured to store the first operation information and the second operation information received by the reception unit;

a first detection unit configured to detect a frequent occurrence of failures in the image forming apparatus based on the first operation information;

a second detection unit configured to detect a resolution of the frequent occurrence of failures based on the second operation information;

an output unit configured to output information that explicitly indicates the resolution of the frequent occurrence of failures in response to the detection of the resolution of the frequent occurrence of failures;

a third detection unit configured to detect a component replaced in the image forming apparatus based on third operation information; and a storage control unit configured to cause a database to store information about the replaced component in an explicit form according to detection thereof by the third detection unit, wherein the output unit also outputs information about component replacement in response to the detection of the component replacement by the third detection unit in the frequent failure occurrence time.

17. An image forming apparatus monitoring system configured to monitor at least one image forming apparatus, comprising:
a reception unit configured to receive first operation information and second operation information concerning the image forming apparatus;
a storage unit configured to store the first operation information and the second operation information received by the reception unit;
a first detection unit configured to detect a frequent occurrence of failures in the image forming apparatus based on the first operation information;
a second detection unit configured to detect a resolution of the frequent occurrence of failures based on the second operation information;
an output unit configured to output information that explicitly indicates the resolution of the frequent occurrence of failures in response to the detection of the resolution of the frequent occurrence of failures; and
a setting unit configured to set a detection sensitivity of the first detection unit which detects the frequent occurrence of failures, or to set a detection sensitivity of the second detection unit which detects the resolution of the frequent occurrence of failures.

18. An image forming apparatus monitoring system configured to monitor at least one image forming apparatus, comprising:
a reception unit configured to receive first operation information and second operation information concerning the image forming apparatus;
a storage unit configured to store the first operation information and the second operation information received by the reception unit;
a first detection unit configured to detect a frequent occurrence of failures in the image forming apparatus based on the first operation information;
a second detection unit configured to detect a resolution of the frequent occurrence of failures based on the second operation information; and
an output unit configured to output information that explicitly indicates the resolution of the frequent occurrence of failures in response to the detection of the resolution of the frequent occurrence of failures,
wherein the first operation information relates to a failure of the image forming apparatus, and wherein the second operation information relates to an operating amount of the image forming apparatus.

19. An image forming apparatus monitoring system configured to monitor at least one image forming apparatus, comprising:
a reception unit configured to receive first operation information and second operation information concerning the image forming apparatus;
a storage unit configured to store the first operation information and the second operation information received by the reception unit;
a first detection unit configured to detect a frequent occurrence of failures in the image forming apparatus based on the first operation information;

a second detection unit configured to detect a resolution of the frequent occurrence of failures based on the second operation information; and
an output unit configured to output information that explicitly indicates the resolution of the frequent occurrence of failures in response to the detection of the resolution of the frequent occurrence of failures,
wherein the second operation information concerns the number of sheets printed in the image forming apparatus, or the number of print pages.

20. A method to monitor at least one image forming apparatus, comprising:
receiving first operation information and second operation information concerning the image forming apparatus;
storing the first operation information and the second operation information received;
detecting a frequent occurrence of failures in the image forming apparatus based on the first operation information;
detecting a resolution of the frequent occurrence of failures based on the second operation information;
outputting information that explicitly indicates the resolution of the frequent occurrence of failures in response to the detection of the resolution of the frequent occurrence of failures;
detecting a component replaced in the image forming apparatus based on third operation information;
causing a database to store information about the replaced component in an explicit form in response to the detection of the replaced component; and
outputting information explicitly indicating the detection of the replaced component and the frequent failure occurrence time associated with the replaced component.

21. A method to monitor at least one image forming apparatus, comprising:
receiving first operation information and second operation information concerning the image forming apparatus;
storing the first operation information and the second operation information received;
detecting a frequent occurrence of failures in the image forming apparatus based on the first operation information;
detecting a resolution of the frequent occurrence of failures based on the second operation information;
outputting information that explicitly indicates the resolution of the frequent occurrence of failures in response to the detection of the resolution of the frequent occurrence of failures;
setting a detection sensitivity at which the frequent occurrence of failures is detected; and
setting a detection sensitivity at which the resolution of the frequent occurrence of failures is detected.

22. A method to monitor at least one image forming apparatus, comprising:
receiving first operation information and second operation information concerning the image forming apparatus;
storing the first operation information and the second operation information received;
detecting a frequent occurrence of failures in the image forming apparatus based on the first operation information;
detecting a resolution of the frequent occurrence of failures based on the second operation information;

outputting information that explicitly indicates the resolution of the frequent occurrence of failures in response to the detection of the resolution of the frequent occurrence of failures;

wherein the first operation information relates to a failure of the image forming apparatus, and wherein the second operation information relates to an operating amount of the image forming apparatus.

23. A method to monitor at least one image forming apparatus, comprising:

receiving first operation information and second operation information concerning the image forming apparatus;

storing the first operation information and the second operation information received;

detecting a frequent occurrence of failures in the image forming apparatus based on the first operation information;

detecting a resolution of the frequent occurrence of failures based on the second operation information; and outputting information that explicitly indicates the resolution of the frequent occurrence of failures in response to the detection of the resolution of the frequent occurrence of failures, wherein the second operation information concerns the number of sheets printed in the image forming apparatus, or the number of print pages.

* * * * *